(12) United States Patent
Hubbard et al.

(10) Patent No.: US 9,654,495 B2
(45) Date of Patent: May 16, 2017

(54) SYSTEM AND METHOD OF ANALYZING WEB ADDRESSES

(75) Inventors: Dan Hubbard, Carlsbad, CA (US); Alan Tse, San Diego, CA (US)

(73) Assignee: Websense, LLC, Austin, TX (US)

( * ) Notice: Subject to any disclaimer, the term of this patent is extended or adjusted under 35 U.S.C. 154(b) by 533 days.

(21) Appl. No.: 11/680,494

(22) Filed: Feb. 28, 2007

(65) Prior Publication Data

US 2008/0133540 A1    Jun. 5, 2008

Related U.S. Application Data

(60) Provisional application No. 60/868,305, filed on Dec. 1, 2006.

(51) Int. Cl.
*G06F 17/21* (2006.01)
*H04L 29/06* (2006.01)

(52) U.S. Cl.
CPC .......... *H04L 63/145* (2013.01); *H04L 63/101* (2013.01); *H04L 63/1483* (2013.01)

(58) Field of Classification Search
CPC ......... G06F 17/30864; G06F 17/30887; G06F 17/30; G06F 17/30412; G06F 17/30705; G06F 17/3089; G06F 17/3053; G06F 17/30911; G06F 17/30923; G06F 17/30598; G06F 17/30082; G06F 17/30203; G06F 17/30893; G06F 17/30896; G06F 17/30233; G06F 2201/865; G06F 2201/875; G06F 2221/2119; G06F 2221/2149; G06F 2212/152; G06F 21/577; G06F 21/552; G06F 21/566; G06F 21/50; G06F 21/554; G06F 21/00; G06F 21/6218; G06F 21/53; G06F 21/56; G06F 9/455
See application file for complete search history.

(56) References Cited

U.S. PATENT DOCUMENTS 4,423,414 A    12/1983   Bryant et al.
4,734,036 A    3/1988    Kasha
(Continued)

FOREIGN PATENT DOCUMENTS

EP    0 658 837 A2    12/1994
EP    0 748 095       12/1996
(Continued)

OTHER PUBLICATIONS

Adam Lyon, "Free Spam Filtering Tactics Using Eudora", May 21, 2004, pp. 1-4.*
(Continued)

*Primary Examiner* — Boris Gorney
*Assistant Examiner* — Amanda Willis
(74) *Attorney, Agent, or Firm* — Schwegman Lundberg & Woessner, P.A.

(57) ABSTRACT

A system and method are provided for identifying active content in websites on a network. One embodiment includes a method of classifying web addresses. One embodiment may include a method of generating a score indicative of the reputation, or likelihood that a web site associated with an uncategorized URL contains active or other targeted content based on an analysis of the URL. In certain embodiments, the score is determined solely from the URL string. Other embodiments include systems configured to perform such methods.

23 Claims, 23 Drawing Sheets

(56) References Cited

U.S. PATENT DOCUMENTS

| | | | |
|---|---|---|---|
| 4,825,354 A | 4/1989 | Agrawal et al. |
| 4,941,084 A | 7/1990 | Terada et al. |
| 5,317,568 A | 5/1994 | Bixby et al. |
| 5,408,642 A | 4/1995 | Mann |
| 5,414,833 A | 5/1995 | Hershey et al. |
| 5,425,028 A | 6/1995 | Britton et al. |
| 5,493,692 A | 2/1996 | Theimer et al. |
| 5,541,911 A | 7/1996 | Nilakantan et al. |
| 5,548,729 A | 8/1996 | Akiyoshi et al. |
| 5,555,376 A | 9/1996 | Theimer et al. |
| 5,581,703 A | 12/1996 | Baugher et al. |
| 5,581,804 A | 12/1996 | Cameron et al. |
| 5,586,121 A | 12/1996 | Moura et al. |
| 5,590,403 A | 12/1996 | Cameron et al. |
| 5,596,330 A | 1/1997 | Yokev et al. |
| 5,606,668 A | 2/1997 | Shwed |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss |
| 5,712,979 A | 1/1998 | Graber et al. |
| 5,720,033 A | 2/1998 | Deo |
| 5,724,576 A | 3/1998 | Letourneau |
| 5,742,759 A | 4/1998 | Nessett et al. |
| 5,758,257 A | 5/1998 | Herz et al. |
| 5,768,519 A | 6/1998 | Swift et al. |
| 5,774,668 A | 6/1998 | Choquier |
| 5,781,801 A | 7/1998 | Flanagan et al. |
| 5,787,253 A | 7/1998 | McCreery et al. |
| 5,787,427 A | 7/1998 | Benantar et al. |
| 5,796,944 A | 8/1998 | Hill et al. |
| 5,799,002 A | 8/1998 | Krishnan |
| 5,801,747 A | 9/1998 | Bedard |
| 5,826,014 A | 10/1998 | Coley et al. |
| 5,828,833 A | 10/1998 | Belville et al. |
| 5,828,835 A | 10/1998 | Isfeld et al. |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,835,726 A | 11/1998 | Shwed et al. |
| 5,842,040 A | 11/1998 | Hughes et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,875,329 A | 2/1999 | Shan |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,893,086 A | 4/1999 | Schmuck et al. |
| 5,896,502 A | 4/1999 | Shieh et al. |
| 5,898,830 A | 4/1999 | Wesinger et al. |
| 5,899,991 A | 5/1999 | Karch |
| 5,899,995 A | 5/1999 | Millier et al. |
| 5,911,043 A | 6/1999 | Duffy et al. |
| 5,919,257 A | 7/1999 | Trostle |
| 5,920,859 A | 7/1999 | Li |
| 5,933,827 A | 8/1999 | Cole et al. |
| 5,937,404 A | 8/1999 | Csaszar et al. |
| 5,941,947 A | 8/1999 | Brown et al. |
| 5,944,794 A | 8/1999 | Okamoto et al. |
| 5,950,195 A | 9/1999 | Stockwell et al. |
| 5,956,734 A | 9/1999 | Schmuck et al. |
| 5,958,015 A | 9/1999 | Dascalu |
| 5,961,591 A | 10/1999 | Jones et al. |
| 5,963,941 A | 10/1999 | Hirakawa |
| 5,968,176 A | 10/1999 | Nessett et al. |
| 5,974,549 A * | 10/1999 | Golan ........................ 726/23 |
| 5,978,807 A | 11/1999 | Mano et al. |
| 5,983,270 A | 11/1999 | Abraham et al. |
| 5,987,457 A | 11/1999 | Ballard |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 5,999,929 A | 12/1999 | Goodman |
| 6,012,832 A | 1/2000 | Saunders et al. |
| 6,052,723 A | 4/2000 | Ginn |
| 6,052,730 A | 4/2000 | Felciano et al. |
| 6,055,564 A | 4/2000 | Phaal |
| 6,058,389 A | 5/2000 | Chandra et al. |
| 6,065,056 A | 5/2000 | Bradshaw et al. |
| 6,065,059 A | 5/2000 | Shieh et al. |
| 6,070,166 A | 5/2000 | Whittaker et al. |
| 6,070,242 A | 5/2000 | Wong et al. |
| 6,073,135 A | 6/2000 | Broder et al. |
| 6,073,239 A | 6/2000 | Dotan |
| 6,078,913 A | 6/2000 | Aoki et al. |
| 6,078,914 A | 6/2000 | Redfern |
| 6,085,241 A | 7/2000 | Otis |
| 6,085,277 A | 7/2000 | Nordstrom et al. |
| 6,092,194 A | 7/2000 | Touboul |
| 6,105,027 A | 8/2000 | Schneider et al. |
| 6,154,741 A | 11/2000 | Feldman |
| 6,173,364 B1 | 1/2001 | Zenchelsky et al. |
| 6,175,830 B1 | 1/2001 | Maynard |
| 6,178,419 B1 | 1/2001 | Legh-Smith et al. |
| 6,178,505 B1 | 1/2001 | Schneider et al. |
| 6,182,118 B1 | 1/2001 | Finney et al. |
| 6,185,681 B1 | 2/2001 | Zizzi |
| 6,219,667 B1 | 4/2001 | Lu et al. |
| 6,233,618 B1 * | 5/2001 | Shannon ........................ 709/229 |
| 6,233,686 B1 | 5/2001 | Zenchelsky et al. |
| 6,246,977 B1 | 6/2001 | Messerly et al. |
| 6,253,188 B1 | 6/2001 | Witek et al. |
| 6,256,739 B1 | 7/2001 | Skopp et al. |
| 6,266,664 B1 * | 7/2001 | Russell-Falla et al. ...... 707/700 |
| 6,266,668 B1 | 7/2001 | Vanderveldt et al. |
| 6,286,001 B1 | 9/2001 | Walker et al. |
| 6,295,529 B1 | 9/2001 | Corston-Oliver et al. |
| 6,295,559 B1 | 9/2001 | Emens et al. |
| 6,301,658 B1 | 10/2001 | Koehler |
| 6,338,088 B1 | 1/2002 | Waters et al. |
| 6,356,864 B1 | 3/2002 | Foltz et al. |
| 6,357,010 B1 | 3/2002 | Viets et al. |
| 6,377,577 B1 | 4/2002 | Bechtolsheim et al. |
| 6,389,472 B1 | 5/2002 | Hughes et al. |
| 6,418,433 B1 | 7/2002 | Chakrabarti et al. |
| 6,434,662 B1 | 8/2002 | Greene et al. |
| 6,446,061 B1 | 9/2002 | Doerre et al. |
| 6,446,119 B1 | 9/2002 | Olah et al. |
| 6,456,306 B1 | 9/2002 | Chin et al. |
| 6,460,141 B1 | 10/2002 | Olden |
| 6,466,940 B1 | 10/2002 | Mills |
| 6,486,892 B1 | 11/2002 | Stern |
| 6,493,744 B1 | 12/2002 | Emens et al. |
| 6,493,758 B1 | 12/2002 | McLain |
| 6,505,201 B1 | 1/2003 | Haitsuka et al. |
| 6,516,337 B1 | 2/2003 | Tripp et al. |
| 6,519,571 B1 | 2/2003 | Guheen et al. |
| 6,539,430 B1 | 3/2003 | Humes |
| 6,564,327 B1 | 5/2003 | Klensin et al. |
| 6,567,800 B1 | 5/2003 | Barrera et al. |
| 6,571,249 B1 | 5/2003 | Garrecht et al. |
| 6,574,660 B1 | 6/2003 | Pashupathy et al. |
| 6,606,659 B1 | 8/2003 | Hegli et al. |
| 6,643,797 B1 | 11/2003 | Horowitz |
| 6,654,735 B1 | 11/2003 | Eichstaedt et al. |
| 6,654,787 B1 | 11/2003 | Aronson et al. |
| 6,675,169 B1 | 1/2004 | Bennett et al. |
| 6,741,997 B1 | 5/2004 | Liu et al. |
| 6,742,003 B2 | 5/2004 | Heckerman et al. |
| 6,745,367 B1 | 6/2004 | Bates et al. |
| 6,754,621 B1 | 6/2004 | Cunningham et al. |
| 6,769,009 B1 | 7/2004 | Reisman |
| 6,772,214 B1 | 8/2004 | McClain et al. |
| 6,785,732 B1 | 8/2004 | Bates et al. |
| 6,804,780 B1 | 10/2004 | Touboul |

(56) References Cited

U.S. PATENT DOCUMENTS

| | | |
|---|---|---|
| 6,807,558 B1 | 10/2004 | Hassett et al. |
| 6,817,018 B1 | 11/2004 | Clarke et al. |
| 6,832,230 B1 | 12/2004 | Zilliacus et al. |
| 6,832,256 B1 | 12/2004 | Toga |
| 6,839,680 B1 | 1/2005 | Liu et al. |
| 6,862,713 B1 | 3/2005 | Kraft et al. |
| 6,894,991 B2 | 5/2005 | Ayyagari et al. |
| 6,907,425 B1 | 6/2005 | Barrera et al. |
| 6,947,935 B1 | 9/2005 | Horvitz et al. |
| 6,947,985 B2 | 9/2005 | Hegli et al. |
| 6,978,292 B1 | 12/2005 | Murakami et al. |
| 6,981,281 B1 | 12/2005 | LaMacchia et al. |
| 6,988,209 B1 * | 1/2006 | Balasubramaniam et al. . 726/22 |
| 7,003,442 B1 | 2/2006 | Tsuda |
| 7,051,200 B1 | 5/2006 | Manferdelli et al. |
| 7,058,822 B2 | 6/2006 | Edery et al. |
| 7,065,483 B2 | 6/2006 | Decary et al. |
| 7,080,000 B1 | 7/2006 | Cambridge |
| 7,089,246 B1 | 8/2006 | O'laughlen |
| 7,093,293 B1 | 8/2006 | Smithson et al. |
| 7,096,493 B1 | 8/2006 | Liu |
| 7,100,199 B2 | 8/2006 | Ginter et al. |
| 7,133,409 B1 | 11/2006 | Willardson |
| 7,136,867 B1 | 11/2006 | Chatterjee et al. |
| 7,185,015 B2 | 2/2007 | Kester et al. |
| 7,185,361 B1 | 2/2007 | Ashoff et al. |
| 7,194,554 B1 | 3/2007 | Short et al. |
| 7,197,713 B2 | 3/2007 | Stern |
| 7,203,706 B2 | 4/2007 | Jain et al. |
| 7,209,893 B2 | 4/2007 | Nii |
| 7,213,069 B2 | 5/2007 | Anderson et al. |
| 7,219,299 B2 | 5/2007 | Fields et al. |
| 7,260,583 B2 | 8/2007 | Wiener et al. |
| 7,313,823 B2 | 12/2007 | Gao |
| 7,359,372 B2 | 4/2008 | Pelletier et al. |
| 7,370,365 B2 | 5/2008 | Carroll et al. |
| 7,373,385 B2 | 5/2008 | Prakash |
| 7,376,154 B2 | 5/2008 | Ilnicki et al. |
| 7,376,969 B1 | 5/2008 | Njemanze et al. |
| 7,389,532 B2 | 6/2008 | Swander |
| 7,447,215 B2 | 11/2008 | Lynch et al. |
| 7,487,217 B2 | 2/2009 | Buckingham et al. |
| 7,533,148 B2 | 5/2009 | McMillan et al. |
| 7,536,437 B2 | 5/2009 | Zmolek |
| 7,548,922 B2 | 6/2009 | Altaf et al. |
| 7,562,304 B2 | 7/2009 | Dixon et al. |
| 7,568,002 B1 | 7/2009 | Vacanti et al. |
| 7,587,488 B2 | 9/2009 | Ahlander et al. |
| 7,603,685 B2 | 10/2009 | Knudson et al. |
| 7,603,687 B2 | 10/2009 | Pietraszak et al. |
| 7,610,342 B1 | 10/2009 | Pettigrew et al. |
| 7,627,670 B2 | 12/2009 | Haverkos |
| 7,647,383 B1 | 1/2010 | Boswell et al. |
| 7,660,861 B2 | 2/2010 | Taylor |
| 7,664,819 B2 | 2/2010 | Murphy et al. |
| RE41,168 E | 3/2010 | Shannon |
| 7,689,716 B2 | 3/2010 | Short et al. |
| 7,690,013 B1 | 3/2010 | Eldering et al. |
| 7,693,945 B1 | 4/2010 | Dulitz et al. |
| 7,739,338 B2 | 6/2010 | Taylor |
| 7,739,494 B1 * | 6/2010 | McCorkendale et al. .... 713/156 |
| 7,797,443 B1 | 9/2010 | Pettigrew et al. |
| 7,870,203 B2 | 1/2011 | Judge et al. |
| 7,895,445 B1 | 2/2011 | Albanese et al. |
| 7,899,866 B1 | 3/2011 | Buckingham et al. |
| 7,941,490 B1 | 5/2011 | Cowings |
| 7,966,658 B2 | 6/2011 | Singh et al. |
| 8,533,349 B2 | 9/2013 | Hegli et al. |
| 9,038,184 B1 | 5/2015 | Mann |
| 2001/0032205 A1 | 10/2001 | Kubaitis |
| 2001/0032258 A1 | 10/2001 | Ishida et al. |
| 2001/0039582 A1 | 11/2001 | McKinnon et al. |
| 2001/0047343 A1 | 11/2001 | Dahan et al. |
| 2001/0047474 A1 | 11/2001 | Takagi |
| 2002/0042821 A1 | 4/2002 | Muret et al. |
| 2002/0049883 A1 | 4/2002 | Schneider et al. |
| 2002/0059221 A1 | 5/2002 | Whitehead et al. |
| 2002/0062359 A1 | 5/2002 | Klopp et al. |
| 2002/0069368 A1 | 6/2002 | Hines |
| 2002/0073089 A1 | 6/2002 | Schwartz et al. |
| 2002/0078045 A1 | 6/2002 | Dutta |
| 2002/0087882 A1 | 7/2002 | Schneier et al. |
| 2002/0091947 A1 | 7/2002 | Nakamura |
| 2002/0095415 A1 | 7/2002 | Walker et al. |
| 2002/0095592 A1 | 7/2002 | Daniell et al. |
| 2002/0099952 A1 | 7/2002 | Lambert et al. |
| 2002/0110084 A1 | 8/2002 | Butt et al. |
| 2002/0120705 A1 | 8/2002 | Schiavone et al. |
| 2002/0129039 A1 | 9/2002 | Majewski et al. |
| 2002/0129140 A1 | 9/2002 | Peled et al. |
| 2002/0129277 A1 | 9/2002 | Caccavale |
| 2002/0133509 A1 | 9/2002 | Johnston et al. |
| 2002/0144129 A1 | 10/2002 | Malivanchuk et al. |
| 2002/0152284 A1 | 10/2002 | Cambray et al. |
| 2002/0174358 A1 | 11/2002 | Wolff et al. |
| 2002/0178374 A1 | 11/2002 | Swimmer et al. |
| 2002/0188671 A1 | 12/2002 | Kogut-O'Connell et al. |
| 2002/0199095 A1 | 12/2002 | Bandini et al. |
| 2003/0005112 A1 | 1/2003 | Krautkremer |
| 2003/0009495 A1 | 1/2003 | Adjaoute |
| 2003/0018491 A1 | 1/2003 | Nakahara et al. |
| 2003/0018903 A1 | 1/2003 | Greca et al. |
| 2003/0023860 A1 | 1/2003 | Eatough et al. |
| 2003/0028564 A1 | 2/2003 | Sanfilippo |
| 2003/0061279 A1 | 3/2003 | Llewellyn et al. |
| 2003/0074567 A1 | 4/2003 | Charbonneau |
| 2003/0088680 A1 | 5/2003 | Nachenberg et al. |
| 2003/0093694 A1 | 5/2003 | Medvinsky et al. |
| 2003/0097591 A1 | 5/2003 | Pham et al. |
| 2003/0097617 A1 | 5/2003 | Goeller et al. |
| 2003/0105863 A1 | 6/2003 | Hegli et al. |
| 2003/0110168 A1 | 6/2003 | Kester et al. |
| 2003/0110272 A1 | 6/2003 | Du Castel et al. |
| 2003/0121983 A1 | 7/2003 | Herle |
| 2003/0126136 A1 | 7/2003 | Omoigui |
| 2003/0126139 A1 | 7/2003 | Lee et al. |
| 2003/0135611 A1 | 7/2003 | Kemp et al. |
| 2003/0135756 A1 | 7/2003 | Verma |
| 2003/0149692 A1 | 8/2003 | Mitchell |
| 2003/0158923 A1 | 8/2003 | Burkhart |
| 2003/0177187 A1 | 9/2003 | Levine et al. |
| 2003/0177394 A1 * | 9/2003 | Dozortsev ..................... 713/201 |
| 2003/0182420 A1 | 9/2003 | Jones et al. |
| 2003/0182421 A1 | 9/2003 | Faybishenko et al. |
| 2003/0185395 A1 | 10/2003 | Lee et al. |
| 2003/0185399 A1 | 10/2003 | Ishiguro |
| 2003/0229849 A1 | 12/2003 | Wendt |
| 2004/0003139 A1 | 1/2004 | Cottrille et al. |
| 2004/0003286 A1 | 1/2004 | Kaler et al. |
| 2004/0006621 A1 | 1/2004 | Bellinson et al. |
| 2004/0006706 A1 | 1/2004 | Erlingsson |
| 2004/0015586 A1 | 1/2004 | Hegli et al. |
| 2004/0019656 A1 | 1/2004 | Smith |
| 2004/0030913 A1 | 2/2004 | Liang et al. |
| 2004/0034794 A1 | 2/2004 | Mayer et al. |
| 2004/0049514 A1 | 3/2004 | Burkov |
| 2004/0054498 A1 | 3/2004 | Shipp |
| 2004/0054521 A1 | 3/2004 | Liu |
| 2004/0062106 A1 | 4/2004 | Ramesh et al. |
| 2004/0068479 A1 | 4/2004 | Wolfson et al. |
| 2004/0078591 A1 | 4/2004 | Teixeira et al. |
| 2004/0088570 A1 | 5/2004 | Roberts et al. |
| 2004/0111499 A1 | 6/2004 | Dobrowski et al. |
| 2004/0117624 A1 | 6/2004 | Brandt et al. |
| 2004/0123157 A1 * | 6/2004 | Alagna et al. ............... 713/201 |
| 2004/0128285 A1 | 7/2004 | Green et al. |
| 2004/0139160 A1 | 7/2004 | Wallace et al. |
| 2004/0139165 A1 | 7/2004 | McMillan et al. |
| 2004/0148524 A1 | 7/2004 | Airamo |
| 2004/0153305 A1 | 8/2004 | Enescu et al. |
| 2004/0153644 A1 | 8/2004 | McCorkendale |
| 2004/0167931 A1 | 8/2004 | Han |
| 2004/0172389 A1 | 9/2004 | Galai et al. |
| 2004/0181788 A1 | 9/2004 | Kester et al. |

(56) References Cited

U.S. PATENT DOCUMENTS

| | | |
|---|---|---|
| 2004/0220924 A1 | 11/2004 | Wootton |
| 2005/0015626 A1* | 1/2005 | Chasin .................. 713/201 |
| 2005/0033967 A1 | 2/2005 | Morino et al. |
| 2005/0044156 A1 | 2/2005 | Kaminski et al. |
| 2005/0050139 A1 | 3/2005 | Creamer et al. |
| 2005/0050222 A1 | 3/2005 | Packer |
| 2005/0060140 A1 | 3/2005 | Maddox et al. |
| 2005/0066197 A1 | 3/2005 | Hirata et al. |
| 2005/0071748 A1 | 3/2005 | Shipp |
| 2005/0080855 A1 | 4/2005 | Murray |
| 2005/0080856 A1 | 4/2005 | Kirsch |
| 2005/0091535 A1 | 4/2005 | Kavalam et al. |
| 2005/0108557 A1 | 5/2005 | Kayo et al. |
| 2005/0120229 A1 | 6/2005 | Lahti |
| 2005/0131859 A1 | 6/2005 | Li |
| 2005/0131868 A1 | 6/2005 | Lin et al. |
| 2005/0132042 A1 | 6/2005 | Cryer |
| 2005/0132184 A1 | 6/2005 | Palliyil et al. |
| 2005/0138353 A1 | 6/2005 | Spies |
| 2005/0155012 A1 | 7/2005 | Tayama et al. |
| 2005/0188036 A1 | 8/2005 | Yasuda |
| 2005/0210035 A1 | 9/2005 | Kester et al. |
| 2005/0223001 A1 | 10/2005 | Kester et al. |
| 2005/0251862 A1 | 11/2005 | Talvitie |
| 2005/0256955 A1 | 11/2005 | Bodwell et al. |
| 2005/0257261 A1 | 11/2005 | Shraim et al. |
| 2005/0273858 A1 | 12/2005 | Zadok et al. |
| 2005/0283836 A1 | 12/2005 | Lalonde et al. |
| 2005/0283837 A1* | 12/2005 | Olivier et al. .................. 726/24 |
| 2006/0004636 A1 | 1/2006 | Kester et al. |
| 2006/0004717 A1 | 1/2006 | Ramarathnam et al. |
| 2006/0010217 A1 | 1/2006 | Sood |
| 2006/0026105 A1 | 2/2006 | Endoh |
| 2006/0031213 A1 | 2/2006 | Wilson et al. |
| 2006/0031311 A1 | 2/2006 | Whitney et al. |
| 2006/0031359 A1 | 2/2006 | Clegg et al. |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0059238 A1 | 3/2006 | Slater et al. |
| 2006/0064469 A1 | 3/2006 | Balasubrahmaniyan et al. |
| 2006/0068755 A1 | 3/2006 | Shraim et al. |
| 2006/0069697 A1* | 3/2006 | Shraim et al. .................. 707/102 |
| 2006/0075072 A1 | 4/2006 | Sinclair et al. |
| 2006/0075494 A1 | 4/2006 | Bertman et al. |
| 2006/0075500 A1 | 4/2006 | Bertman et al. |
| 2006/0080735 A1 | 4/2006 | Brinson et al. |
| 2006/0095404 A1 | 5/2006 | Adelman et al. |
| 2006/0095459 A1 | 5/2006 | Adelman et al. |
| 2006/0095586 A1 | 5/2006 | Adelman et al. |
| 2006/0095965 A1 | 5/2006 | Phillips et al. |
| 2006/0101514 A1 | 5/2006 | Milener et al. |
| 2006/0122957 A1 | 6/2006 | Chen |
| 2006/0129644 A1 | 6/2006 | Owen et al. |
| 2006/0161986 A1* | 7/2006 | Singh et al. .................. 726/24 |
| 2006/0168006 A1 | 7/2006 | Shannon et al. |
| 2006/0168022 A1 | 7/2006 | Levin et al. |
| 2006/0191008 A1 | 8/2006 | Fernando et al. |
| 2006/0206713 A1 | 9/2006 | Hickman et al. |
| 2006/0239254 A1 | 10/2006 | Short et al. |
| 2006/0253537 A1 | 11/2006 | Ragy |
| 2006/0259948 A1 | 11/2006 | Calow et al. |
| 2006/0265750 A1 | 11/2006 | Huddleston |
| 2006/0277280 A1 | 12/2006 | Craggs |
| 2006/0288076 A1 | 12/2006 | Cowings et al. |
| 2007/0005762 A1 | 1/2007 | Knox et al. |
| 2007/0011739 A1 | 1/2007 | Zamir et al. |
| 2007/0028302 A1 | 2/2007 | Brennan et al. |
| 2007/0078936 A1 | 4/2007 | Quinlan et al. |
| 2007/0083929 A1 | 4/2007 | Sprosts et al. |
| 2007/0124388 A1* | 5/2007 | Thomas .................. 709/206 |
| 2007/0130351 A1 | 6/2007 | Alperovitch et al. |
| 2007/0156833 A1 | 7/2007 | Nikolov et al. |
| 2007/0195779 A1 | 8/2007 | Judge et al. |
| 2007/0204223 A1 | 8/2007 | Bartels et al. |
| 2007/0260602 A1 | 11/2007 | Taylor |
| 2007/0282952 A1 | 12/2007 | Lund et al. |
| 2007/0294352 A1 | 12/2007 | Shraim et al. |
| 2007/0299915 A1 | 12/2007 | Shraim et al. |
| 2008/0010683 A1* | 1/2008 | Baddour et al. .................. 726/24 |
| 2008/0016339 A1* | 1/2008 | Shukla .................. 713/164 |
| 2008/0077517 A1 | 3/2008 | Sappington |
| 2008/0082662 A1 | 4/2008 | Dandliker et al. |
| 2008/0086372 A1 | 4/2008 | Madhavan et al. |
| 2008/0184366 A1 | 7/2008 | Alperovitch et al. |
| 2008/0209057 A1 | 8/2008 | Martini et al. |
| 2008/0267144 A1 | 10/2008 | Jano et al. |
| 2008/0295177 A1 | 11/2008 | Dettinger et al. |
| 2009/0070872 A1 | 3/2009 | Cowings et al. |
| 2009/0126026 A1 | 5/2009 | Kim et al. |
| 2009/0138573 A1 | 5/2009 | Campbell et al. |
| 2010/0005165 A1 | 1/2010 | Sinclair et al. |
| 2010/0017487 A1 | 1/2010 | Patinkin |
| 2010/0154063 A1 | 6/2010 | Hutton et al. |
| 2010/0205265 A1 | 8/2010 | Milliken et al. |
| 2011/0314546 A1 | 12/2011 | Aziz et al. |
| 2014/0095515 A1 | 4/2014 | Korenwaitz et al. |

FOREIGN PATENT DOCUMENTS

| | | |
|---|---|---|
| EP | 1 180 889 | 2/2002 |
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 484 893 | 12/2004 |
| EP | 1 494 409 | 1/2005 |
| EP | 1 510 945 | 3/2005 |
| EP | 1510945 | 3/2005 |
| EP | 1 638 016 | 3/2006 |
| EP | 1638016 | 3/2006 |
| EP | 1 643 701 | 4/2006 |
| GB | 2418108 | 3/2006 |
| GB | 2418330 | 3/2006 |
| GB | 2418999 | 4/2006 |
| JP | 10 243018 | 9/1998 |
| JP | 11-219363 | 8/1999 |
| JP | 2000-235540 | 8/2000 |
| JP | 2000 235540 A | 8/2000 |
| WO | WO 92/19054 | 10/1992 |
| WO | WO 95/10805 A1 | 4/1995 |
| WO | WO 96/05549 A1 | 2/1996 |
| WO | WO /9605549 A1 | 2/1996 |
| WO | WO 96/42041 | 12/1996 |
| WO | WO 98/28690 | 7/1998 |
| WO | WO 01/024012 | 4/2001 |
| WO | WO 01/31512 | 5/2001 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 2005/010692 | 2/2005 |
| WO | WO 2005/017708 | 2/2005 |
| WO | WO 2005/022319 | 3/2005 |
| WO | WO 2005/074213 | 8/2005 |
| WO | WO 2005/119488 | 12/2005 |
| WO | WO 2006/027590 | 3/2006 |
| WO | WO 2006/030227 A1 | 3/2006 |
| WO | WO 2006/062546 | 6/2006 |
| WO | WO 2006/136605 | 12/2006 |
| WO | WO 2007/059428 A | 5/2007 |
| WO | WO 2008/008339 | 1/2008 |

OTHER PUBLICATIONS

HowStuffWorks, "How Domain Name Servers Work", pp. 1-2, http://www.howstuffworks.com/dns.htm.* vocabulary.com; Utilization; http://www.vocabulary.com/dictionary/utilization; Jan. 23, 2015; pp. 1-4.*

Supplementary European Search Report for EPO App. No. 00 90 7078, mailed May 18, 2004.

(56) References Cited

OTHER PUBLICATIONS

European Search Report for Application No. 02258462.7, mailed Jan. 30, 2006.
Sandhu, et al., Access Control: Principles and Practice, IEEE Communications Magazine, pp. 40-48, Sep. 1994.
C.L.Schuba and E.H. Spafford. Countering abuse of name-based authentication. In 22$^{nd}$ Annual Telecommunications Policy Research Conference, 21 pp., 1996.
Surfcontrol plc, SuperScout Web Filter Reviewer's Guide, 36pp., 2002.
Yialelis, et al., Role-Based Security for Distributed Object Systems, Proceedings of the IEEE Fifty Workshops on Enabling Technology: Infrastructure for Collaborative Enterprises (WET ICE '96), 6pp., Jun. 19-21, 1996.
Roberts-Witt, S., The 1999 Utility Guide: Corporate Filtering, PC Magazine Online, Apr. 5, 1999, pp. 1-11.
Sequel Technology, Inc., Sequel and Surfwatch Partner to Provide Innovative Internet Resource Management Tools for Large Enterprises, Internet, Online!, Feb. 25, 1999, pp. 1-3.
SurfWatch Software, SurfWatch® Professional Edition: Product Overview, Internet, Online!, May 26, 1999, p. 1.
Newman, H., A Look at Some Popular Filtering Systems, Internet, Online!, Jul. 25, 1999, pp. 1-11.
Secure Computing Corporation, SmartFilter™ WebTool, Dec. 1, 1998, pp. 1-2.
Molitor, Andrew. "An Architecture for Advanced Packet Filtering", Jun. 1995 Proceedings of the Fifth USENIX UNIX Security Symposium, pp. 1-11.
Microsoft Press Computer Dictionary, 3$^{rd}$ ed., Microsoft Press, pp. 262, 276, 1997.
Wobus, J., DHCP FAQ, www.nd.edu/~milind/FAQs/FAQ_dhcp, pp. 1-10, Dec. 29, 1995.
Gittler, F., et al., The DCE Security Service, Hewlett-Packard Journal, pp. 41-48, Dec. 1995.
Snyder, J., A Flurry of Firewalls, Network World, www.opus1.com/www/jms/nw-firewall.html, pp. 1-8, Jan. 29, 1996.
C. L. Schuba and E. H. Spafford, Countering abuse of name-based authentication, Pub: In 22nd Annual Telecommunications Policy Research Conference, 1996, pp. 21.
Cohen, F., A Cryptographic Checksum for Integrity Protection, Computers & Security, Elsevier Science Publishers, Dec. 1, 1987, vol. 6, Issue 6, pp. 505-510, Amsterdam, NL.
European Search Report for Application No. 02258462.7, Jan. 30, 2006.
Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.
Gittler F., et al., The DCE Security Service, Pub: Hewlett-Packard Journal, Dec. 1995, pp. 41-48.
IBM Technical Disclosure Bulletin, Mean to Protect System from Virus, IBM Corp., Aug. 1, 1994, Issue 659-660.
International Search Report and Written Opinion dated Jun. 30, 2008 for PCT Patent Application No. PCT/US2007/024557.
International Search Report and Written Opinion for PCT Application No. PCT/US2007/015730 dated Dec. 27, 2008, 16 pages.
International Search Report, International Application No. PCT/US2006/049149, Mailed Mar. 10, 2008, 4 pages.
Microsoft Press Computer Dictionary, 3rd edition, Pub: Microsoft Press, 1997, pp. 262, 276.
Molitor, Andrew, An Architecture for Advanced Packet Filtering, Proceedings for the Fifth Usenix Unix Security Symposium, Jun. 1995, pp. 1-11.
Newman, H., A Look at Some Popular Filtering Systems, Pub: Internet, Online!, Jul. 25, 1999, pp. 1-11.
PCT International Search Report and Written Opinion for corresponding International Application No. PCT/GB2005/002961, Oct. 19, 2005.
Roberts-Witt, S., The 1999 Utility Guide: Corporate Filtering, Pub: PC Magazine Online, Apr. 5, 1999, pp. 1-11.
Sandhu, et al., Access Control: Principles and Practice, IEEE Communications Magazine, Sep. 1994, pp. 40-48.
Secure Computing Corporation, SmartFilter™ Web Tool, Dec. 1, 1998, pp. 1-2.
Sequel Technology, Inc., Sequel and Surfwatch Partner to Provide Innovative Internet Resource Management Tools for Large Enterprises, Pub: Internet, Online!, Feb. 25, 1999, pp. 1-3.
Snyder, J., A Flurry of Firewalls, www.opus1.com/www/jms/nw-firewall.html, Network World, Jan. 29, 1996, pp. 1-8.
Supplementary European Search Report for EPO App. No. 00 90 7078, May 18, 2004.
SurfControl PLC, SuperScout Web Filter Reviewer's Guide, 2002, pp. 36.
Surfcontrol, Project Nomad, http:www.surfcontrol.com/news/newsitem.aspx?id=593, Oct. 29, 2003.
SurfWatch Software, SurfWatch® Professional Edition: Product Overview, Pub: Internet, Online!, May 26, 1999, pp. 1.
Symantec Corporation, E-security begins with sound security policies, Announcement Symantec, XP002265695, Jun. 14, 2001, pp. 1,9.
Williams, R., Data Integrity with Veracity, Retrieved from the Internet: <URL: ftp://ftp.rocksoft.com/clients/rocksoft/papers/vercty10.ps>, Sep. 12, 1994.
Wobus, J., DHCP FAQ, www.nd.edu/~milind/FAQs/FAQ_dhcp, Dec. 29, 1995, pp. 1-10.
Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.
"Google + StopBadware.org = Internet Gestapo?", http://misterpoll.wordpress.com/2007/01/05/google-stopbadwareorg-internet-gestapo/, Jan. 5, 2007.
"Trends in Badware 2007", StopBadware.org, Oct. 10, 2007.
Abiteboul, et al., The Lorel query language for semistructured data, Int'l Journal on Digital Libraries, Apr. 1, 1997, vol. 1, Issue 1, pp. 68-88.
Adam Lyon, "Free Spam Filtering Tactics Using Eudora,", May 21, 2004, pp. 1-4.
Aikawa, Q&A Collection, DOS/V Power Report, Pub: Impress, Inc., May 1, 1998, vol. 8, Issue 5, pp. 358-361, Japan.
Chawathe, et al., Representing and querying changes in a semistructured data, Proceedings from 14th Int'l Conference, Feb. 23-27, 1998, pp. 4-13.
Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.
Dell Zhang, et al., A data model and algebra for the web, Proceedings 10th Int'l Workshop on Florence, Italy, Sep. 1-Mar. 1999, pp. 711-714.
George, Erica, "Google launches new anti-badware API", http://blog.stopbadware.org//2007/06/19/google-launches-new-anti-badware-api, Jun. 19, 2007.
Goldman, R., et al., DataGuides: Enabling Query Formulation and Optimization in Semistructured Databases, Proceedings of the International Conference on Very Large Data Bases, Aug. 26, 1997, pp. 436-445.
Greenfield, P., et al., Access Prevention Techniques for Internet Content Filtering, CSIRO (XP002265027), Dec. 1999.
IBM Corp., Enforced Separation of Roles in a Multi-User Operating System, IBM Technical Disclosure Bulletin, Dec. 1991, Issue 34, pp. 120-122.
Igakura, Tomohiro et al., Specific quality measurement and control of the service-oriented networking application., Technical Report of IEICE, IEICE Association, Jan. 18, 2002, vol. 101, Issue 563, pp. 51-56, Japan.
International Search Report and Written Opinion for International Application No. PCT/GB2005/003482, Dec. 9, 2005.

(56) References Cited

OTHER PUBLICATIONS

Nestorov, et al., Representative objects: concise representations of semistructured, hierarchical Data, Proceedings, 13th Int'l Conference in Birmingham, UK, Apr. 7-Nov. 1997, pp. 79-90.

PCT International Search Report and Written Opinion for International Application No. PCT/US2008/052483, PCT, Feb. 11, 2009.

Reid, Open Systems Security: Traps and Pitfalls, Computer & Security, 1995, Issue 14, pp. 496-517.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Roberts-Witt, The 1999 Utility Guide: Corporate Filtering, http://web.archive.org/web/19990508205337/http://www.zdnet.com/pcmag/features/utilities99/corpfilter01.html; (see corpfilter01.html, corpfilter04.html, and corpfilter09.html), May 4, 1999.

Stein, Web Security—a step by step reference guide, Addison-Wesley, 1997, pp. 387-415.

United Kingdom Search Report for Application No. GB0417620.2 and Combined Search and Examination Report, UKIPO, Oct. 8, 2004.

United Kingdom Search Report for corresponding UK Application No. GB0420023.4, Jan. 31, 2005.

United Kingdom Search Report for corresponding UK Application No. GB0420024.2, Nov. 4, 2004.

United Kingdom Search Report for corresponding UK Application No. GB0420025.9, Jan. 6, 2005.

Zhang et al., The Role of URLs in Objectionable Web Content Categorization, Web Intelligence, 2006.

Hubbard, Dan, Websense Security Labs, The Web Vector: Exploiting Human and Browser Vulnerabilities, Toorcon 2005 (http://www.toorcon.org).

IronPort Web Reputation White Paper, A Comprehensive, Proactive Approach to Web-Based Threats, Ironport Systems 2009, pp. 10.

IronPort Web Reputation: Protect and Defend Against URL-Based Threats; Ironport Systems, Apr. 2006, 8 pages.

Kang et al., Two Phase Approach for Spam-Mail Filtering, Computational and Information Science, First International Symposium, 2004, vol. 3314, pp. 800-805.

Cooley, R., et al., Web Mining: Information and Pattern Discovery on the World Wide Web, Department of Computer Science and Engineering, University of Minnesota, 1997, pp. 1-10.

Lee et al., Neural Networks for Web Content Filtering, IEEE, Sep. 2002, pp. 48-57.

Moshchuk et al., SpyProxy: Execution-based Detection of Malicious Web Content, 16th USENIX Security Symposium, 2007, pp. 27-42.

Yue et al., Characterizing Insecure JavaScript Practices on the Web, WWW Apr. 20, 2009-Apr. 24, 2009, pp. 961-970.

\* cited by examiner

Logging Database — 144

| No. Requests | URL | JavaScript? | ActiveX? |
|---|---|---|---|
| 9000 | www.gougle.com | Yes | Yes |
| 32 | www.amazon.com/specialoftheday | No | Yes |
| 2 | www.sportsweb.com | Yes | No |
| 1 | www.aasdfghd.com | No | No |

URL Access Policy Database — 158

| User | Category | Always block? | Allowed Times |
|---|---|---|---|
| asmith | Malicious | Yes | |
| bnguyen | Gambling | | 6pm – 8 am |
| clee | Spyware | Yes | |
| | Politics | | 6pm – 8 am |

*Categorized URLs*

| URL | Category |
|---|---|
| http://example1.com/abc | Malicious |
| http://example2.biz/abc | Gambling |
| http://example4.com/abc | Spyware |

*Uncategorized URLs*

| URL |
|---|
| http://example4.com/abc |
| http://example6.biz/abc |
| http://example1.com/abc |

URL DATA COLLECTED BY COLLECTION SYSTEM

| IP ADDRESS | URL | PAGE_CONTENT | ACTIVE CONTENT? |
|---|---|---|---|
| 134.34.54.158 | www.gougle.com | BLOB | Yes |
| 152.68.94.129 | www.amazon.com/specialoftheday | BLOB | Yes |
| 10.42.228.233 | www.sportsweb.com | BLOB | No |
| 152.36.242.21 | www.aasdfghd.com | TEXT | No |
| 134.34.54.158 | www.gougle.com/page2.html | BLOB | Yes |

Properties Database

| Property_id | Property | Type |
|---|---|---|
| 1 | <javascript> | Keyword |
| 2 | <object> | Keyword |
| 3 | data=,*\.txt | Regular Expression |
| 4 | Content-Type | HTTP data |

*FIG. 13A*

Processed Web Page Properties Database

| url_id | url |
|---|---|
| 1 | http://www.a.com |
| 2 | http://www.b.com |
| 3 | http://www.c.com |
| 4 | http://www.d.com |

| url_id | Property_id |
|---|---|
| 1 | 1 |
| 1 | 2 |
| 2 | 3 |
| 2 | 4 |
| 3 | 1 |

*FIG. 13B*

Definitions Database

| Expression | Category |
|---|---|
| Content-Type = HTML and "<javascript>" > 2 | Malicious |
| <object> = 6 and URL matches "a.com" | Gambling |
| "data=,*\.txt" = "data=xyx333.txt" | Spyware |

*FIG. 13C*

SYSTEM AND METHOD OF ANALYZING WEB ADDRESSES

RELATED APPLICATIONS

This application claims the benefit of, and incorporates by reference in its entirety, U.S. Provisional Application No. 60/868,305, filed Dec. 1, 2006.

BACKGROUND OF THE INVENTION

Field of the Invention

This application relates to data and application security. In particular, this application discloses systems methods of collecting and mining data to predict the content or nature of a web site based on its web address.

Description of the Related Technology

Traditionally, computer viruses and other malicious content were most often provided to client computers by insertion of an infected diskette or some other physical media into the computer. As the use of e-mail and the Internet increased, e-mail attachments became a prevalent method for distributing virus code to computers. To infect the computer with these types of viruses having malicious content, some affirmative action was typically required by the user such as opening an infected file attachment or downloading an infected file from a web site and launching it on their computer. Over time, antivirus software makers developed increasingly effective programs designed to scan files and disinfect them before they had the opportunity to infect client computers. Thus, computer hackers were forced to create more clever and innovative ways to infect computers with their malicious code.

In today's increasingly-networked digital world, distributed applications are being developed to provide more and more functionality to users in an open, collaborative networking environment. While these applications are more powerful and sophisticated, their increased functionality requires that network servers interact with client computers in a more integrated manner. For example, where previous web applications primarily served HTML content to client browsers and received data back from the client via HTTP post commands, many new web applications are configured to send various forms of targeted content, such as active content, to the client computer which cause applications to be launched within the enhanced features of newer web browsers. For example, many web-based applications now utilize Active-X controls which must be downloaded to the client computer so they may be effectively utilized. Java applets, JavaScript, and VBScript commands also have the capability of modifying client computer files in certain instances.

The convenience that has arrived with these increases in functionality has not come without cost. Newer web applications and content are significantly more powerful than previous application environments. As a result, they also provide opportunities for malicious code to be downloaded to client computers. In addition, as the complexity of the operating system and web browsing applications increase, it becomes more difficult to identify security vulnerabilities which may allow hackers to transfer malicious code to client computers. Although browser and operating system vendors generally issue software updates to remedy these vulnerabilities, many users have not configured their computers to download these updates. Thus, hackers have begun to write malicious code and applications which utilize these vulnerabilities to download themselves to users' machines without relying on any particular activity of the user such as launching an infected file. One example of such an attack is the use of malicious code embedded into an active content object on a website. If the malicious code has been configured to exploit a vulnerability in the web browser, a user may be infected or harmed by the malicious code as a result of a mere visit to that page, as the targeted content in the page will be executed on the user's computer.

An attempt to address the problem of malicious code being embedded in active content is to utilize heightened security settings on the web browser. However, in many corporate environments, intranet or extranet applications are configured to send executable content to client computers. Setting browser settings to a high security level tends to impede or obstruct the effective use of these types of "safe" applications. Another attempt to address the issue is to block all executable content using a network firewall application. This brute force approach also is ineffective in many environments, because selective access to certain types of content is necessary for software to correctly function.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the features of this invention provide advantages that include improved detection of web sites having targeted content.

One embodiment includes a method of controlling access to web content. The method comprises receiving a request for at least one uniform resource locator (URL). The method further comprises generating an indicator of active content associated with the URL. The indicator is based on data associated with at least one component of the URL. The method further comprises determining whether to allow the request based at least partly on the at least indicator.

Another embodiment includes a system for controlling access to web content. The system comprises a gateway server module configured to receive a request for at least one uniform resource locator. The system further comprises a URL analysis module configured to generate an indicator of active content associated with the URL. The indicator is based on data associated with at least one component of the URL. The system further comprises a policy module configured to identify a policy associated with the URL. The system further comprises a content filtering module configured to determine whether to allow the request based at least partly on the at least indicator and the policy.

One embodiment includes a system for controlling access to web content. The system comprises means for receiving a request for at least one uniform resource locator. The system further comprises means for generating an indicator of active content associated with the URL. The indicator is based on data associated with at least one component of the URL. The system further comprises means for identifying a policy associated with the URL. The system further comprises means for determining whether to allow the request based at least partly on the at least indicator and the policy.

BRIEF DESCRIPTION OF THE DRAWINGS

In this description, reference is made to the drawings wherein like parts are designated with like numerals throughout.

FIG. 4 is an example of a logging database.

FIG. 5 is an example of a URL Access Policy database table.

FIGS. 6A and 6B are examples of categorized and uncategorized URLs, respectively.

FIG. 11 is an example of URL-related data collected by the collection module from FIG. 9.

FIG. 13A is an example of a properties table.

FIG. 13B is an example of a processed web page properties table.

FIG. 13C is an example of a definitions table.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Certain embodiments provide for systems and method of identifying and categorizing web content, including potentially executable web content and malicious content, that is found at locations identified by Uniform Resource Locators (URLs). As used herein, potentially executable web content generally refers to any type of content that includes instructions that are executed by a web browser or web client computer. Potentially executable web content may include, for example, applets, executable code embedded in HTML or other hypertext documents (including script languages such as JavaScript or VBScript), executable code embedded in other documents, such as Microsoft Word macros, or stylesheets. Potentially executable web content may also refer to documents that execute code in another location such as another web page, another computer, or on the web browser computer itself. For example, a HTML web page that includes an "OBJECT" element, and thus can cause execution of ActiveX or other executable components, may generally be considered potentially executable web content regardless of the location of the executable components. Malicious content may refer to content that is not executable but which is calculated to exploit a vulnerability on a client computer. However, potentially executable web content may also be malicious content. For example, image files have been used to exploit vulnerabilities in certain operating systems when those images are processed for display. Moreover, malicious web content may also refer to interactive content such as "phishing" schemes in which a HTML form or other web content is designed to appear to be provided by another, typically trusted, web site such as a bank, in order to deceive the user into providing credentials or other sensitive information to an unauthorized party.

Description of System

Figure 1:
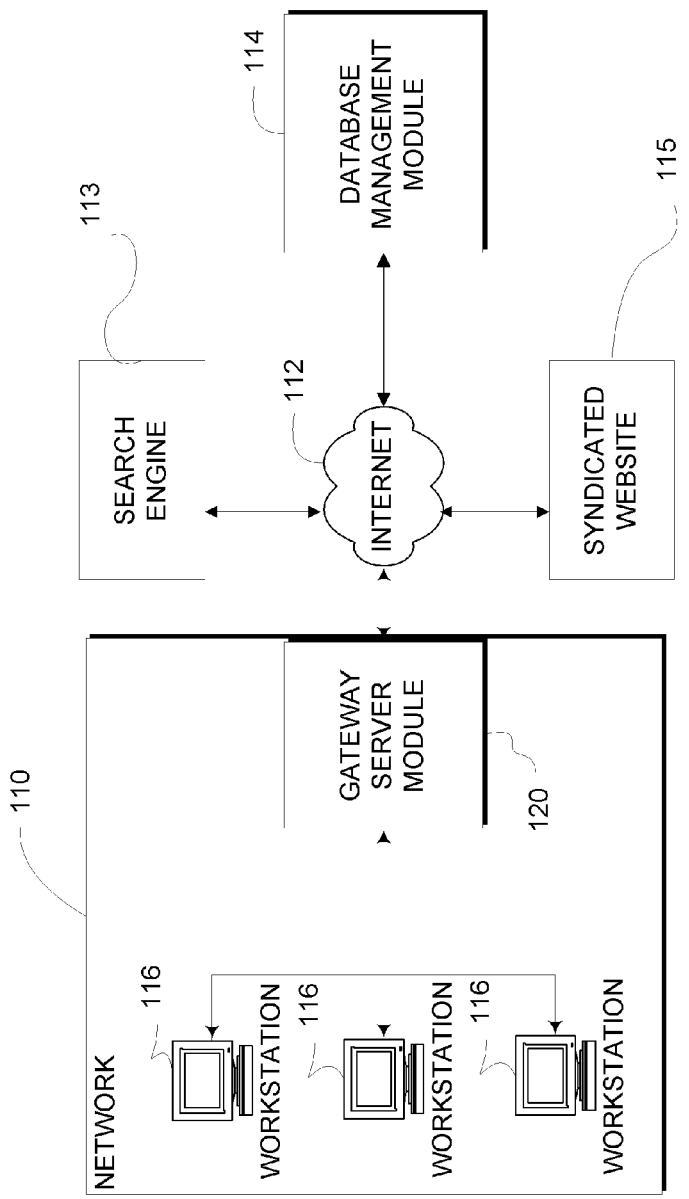
FIG. 1 is a block diagram of various components of a system in accordance with aspects of the invention.

FIG. 1 provides a top level illustration of an exemplary system. The system includes a network 110. The network 110 may be a local area network, a wide area network, or some other type of network. The network 110 may include one or more workstations 116. The workstations 116 may be various types of client computers that are attached to the network. The client computers 116 may be desktop computers, notebook computers, handheld computers or the like. The client computers may also be loaded with operating systems that allow them to utilize the network through various software modules such as web browsers, e-mail programs, or the like.

Each of the workstations 116 may be in electrical communication with a gateway server module 120. The gateway server module may reside at the edge of the network 110 so that traffic sent to and from the Internet 112 may pass through it on its way into or out of the network 110. The gateway server module 120 may take the form of a software module that is installed on a server that stands as a gateway to a wider area network 112 than the network 110 to which the workstations 116 are directly attached. Also connected to the Internet 112 is a database management module 114. The database management module also may be a software module (or one or more hardware appliances) which resides on one or more computing devices. The database management module 114 may reside on a machine that includes some sort of network connecting hardware, such as a network interface card, which allows the database management module 114 to send and receive data and information to and from the Internet 112.

In the example system of FIG. 1, one or more of the work stations 116 may be in communication with one or more search engines 113 via the Internet 112. The search engine 113 is typically a web site which receives user requests for information and websites which are relevant to the parameters of the submitted user requests. Well known examples of search engines are Google, Yahoo, and Ask.com.

In the example system of FIG. 1, one or more of the work stations 116 may be in communication with one or more syndicated websites 115 via the Internet 112. The syndicated website 115 offers a web feed of content from the website. Typically, the content from the syndicated website 115 is accessed by web feed readers installed on client workstations 116.

Figure 2:
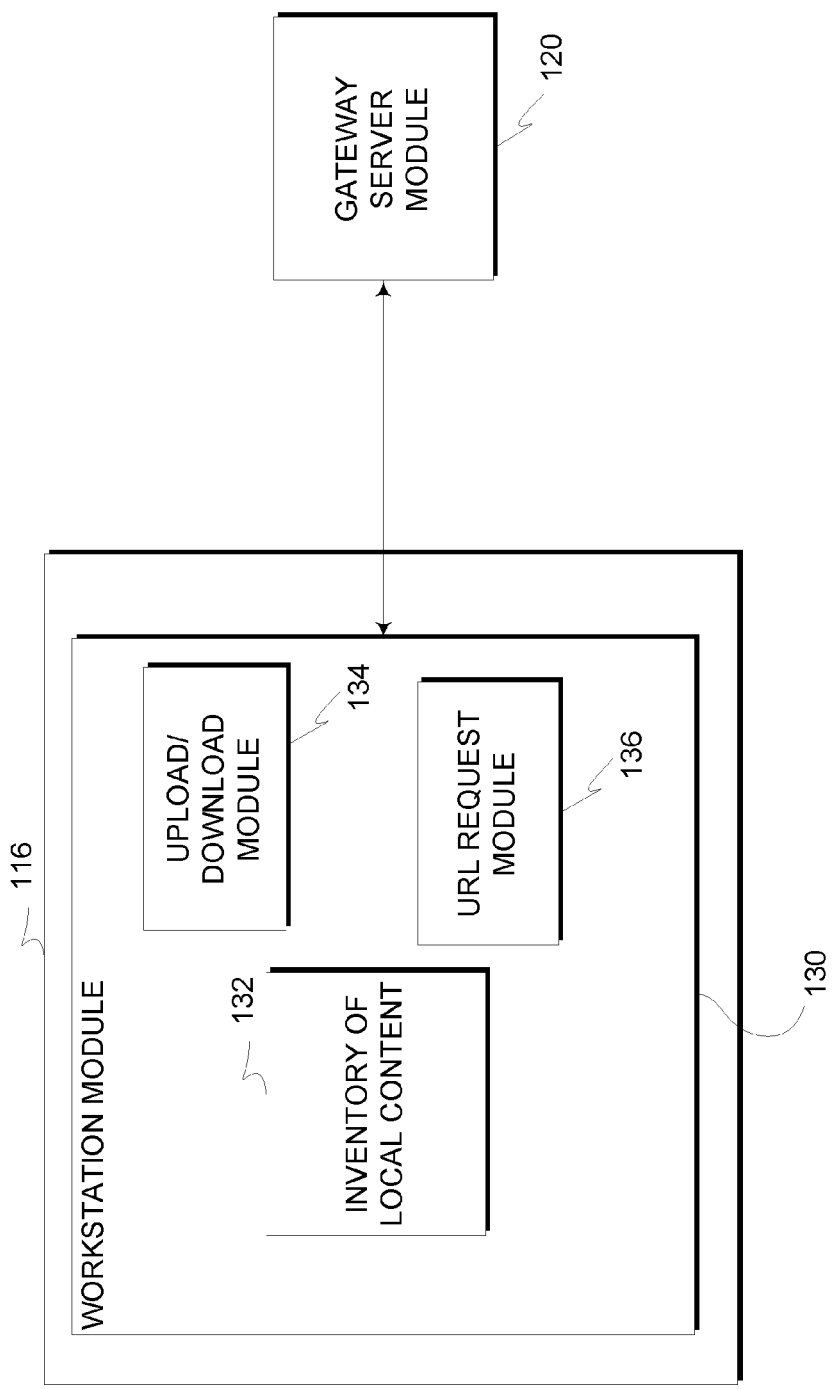
FIG. 2 is a block diagram of a workstation module from FIG. 1.

Referring now to FIG. 2, a more detailed view of the workstation 116 is presented. The workstation 116 may include a workstation module 130. The workstation module 130 may take the form of software installed to run on the operating system of the workstation 116. Alternatively, the workstation module 130 could be an application running on another machine that is launched remotely by the workstation 116.

The workstation module 130 may include various components. The workstation module may include an inventory of a local active content module 132 which records all web content stored on the workstation 116. For example, the local content inventory module 132 may periodically inventory all local content. The inventoried data may be uploaded to the gateway server module 120 for comparison to a categorized URL/content database 146, which is discussed below in more detail. The local content inventory module 132 may determine whether new content is being introduced to the workstation 116 by comparison to the inventoried local content contained therein.

The workstation module 130 also may include one or more upload/download modules 134 and one or more URL request modules 136. The upload/download modules 134 may be used to send and receive data from the network 110, through the gateway server module 120 and to the Internet 112. The URL request module 136 may receive a data request from either a user or some system process, and send the request via the gateway server module 120 to retrieve the file and/or content associated with the request. The request may be a search engine request made to the search engine 113. In response to the search, the search engine 113 may return one website or a list of websites (and URL links leading to those websites) based on the search parameters. The request may also be a content request made to the syndicated website 115. In response to the request, the syndicated website 115 may return one URL link or a list of URL links to the requested content. For ease of explanation, the term network request is used to include user requests for content via the search engine 113 or requests sent via a web feed reader to the syndicated website 115. The system of FIG. 1 monitors and/or modifies the data returned in response to the network request to inhibit objectionable or malicious content from being available to the user.

Typically, the functions of each of the upload/download modules 134 and the URL request modules 136 are performed by software applications such as web browsers, with Internet Explorer®, Mozilla Firefox, Opera, Safari, being examples of browsing software well-known in the art. These functions may also be performed by other types of software such as web feed readers, instant messaging programs, peer-to-peer file sharing applications, digital media player applications (e.g., iTunes®, RealPlayer, Quicktime), or some other applications.

Alternatively, the functions of the modules may be divided among different software applications. For example, an FTP application may perform the functions of the upload/download module 134, while a web browser performs the functions of sending requests to the search engine. A web feed reader application may send a request for content to the syndicated website 115. Other types of software may also perform the functions of the upload/download module 134. Although these types of software are generally not desirable on a workstation, software such as Spyware, or Trojan Horses may make requests to send and receive data from the Internet.

Figure 3:
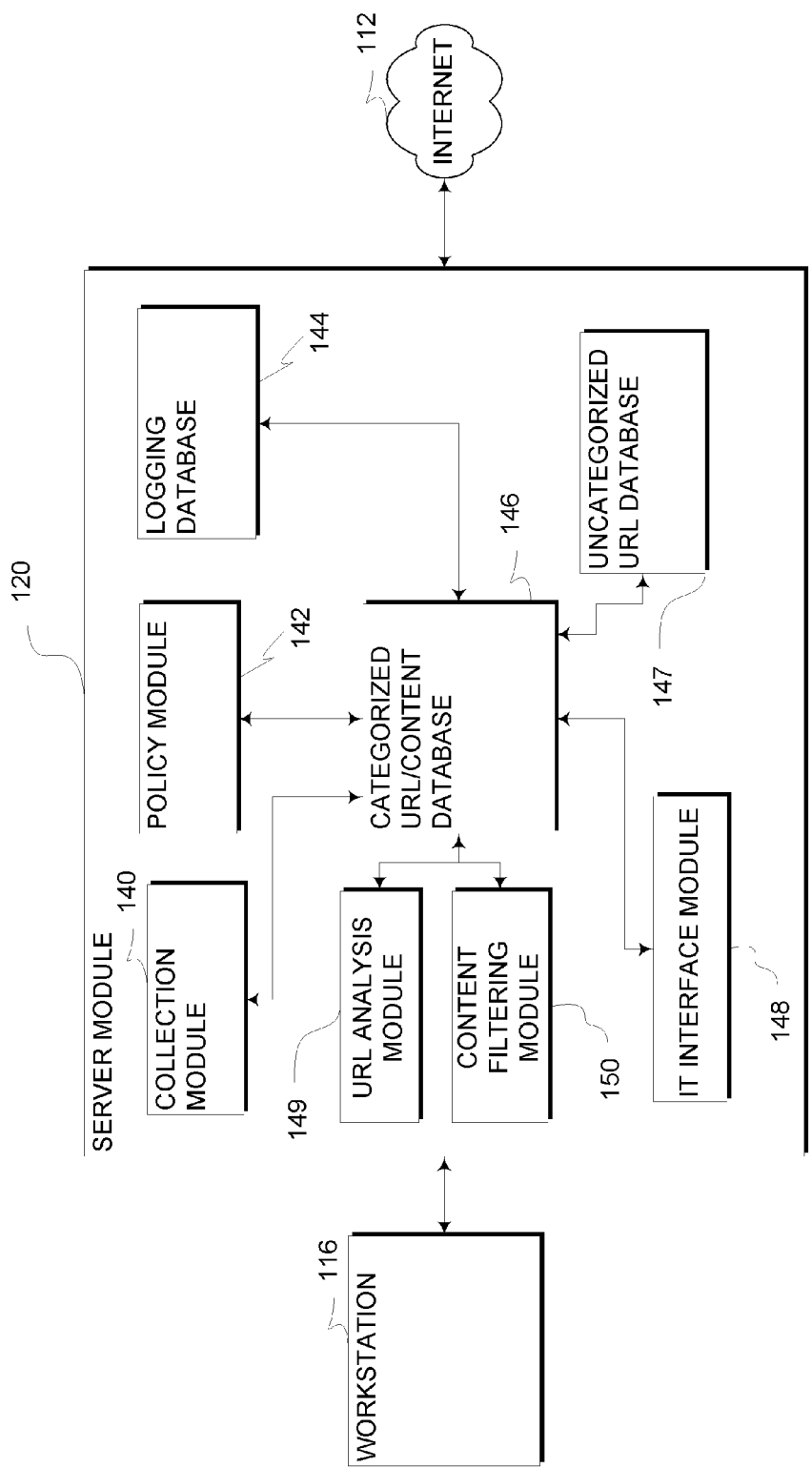
FIG. 3 is a block diagram of a gateway server module from FIG. 1.

The workstation module 130 may be in communication with the gateway server module 120. The gateway server module 120 may be used to analyze incoming and outgoing web traffic and to make various determinations about the impact the traffic may have on the workstations 116. Referring now to FIG. 3, an example of the gateway server module 120 is provided. The gateway server module 120 is in two way communication with the workstation 116. It may receive file uploads and downloads and URL requests from the workstation module 130. The gateway server module 120 is also in two way communication with the Internet 112. Thus, requests originating within the workstations 116 of the network 110 may be required to pass through the gateway server module 120 as they proceed to the Internet. In some embodiments, the gateway server module 120 may be integrated with some firewall hardware or software that protects the network 110 from unauthorized intrusions from the Internet 112. In other embodiments, the gateway server module 120 may be a standalone hardware appliance or even a software module installed on a separate gateway server residing at the network gateway to the Internet 112.

As discussed above, the gateway server module 120 may receive URL requests and upload/download data from the workstation 116 by way of the workstation module 130. The gateway server module 120 may include various components that perform various functions based on the data received.

One feature included in the gateway server module 120 is the categorized URL/content database 146. The URL database 146 may be used to store information about URLs including data that is associated with the URLs. The categorized URL/content database 146 may be a relational database, or it may be stored in some other form such as a flat file, an object-oriented database, and may be accessed via an application programming interface (API), or some database management software (DBMS). The URL database 146 may generally be used to help determine whether URL requests sent by the URL request module 136 will be permitted to be completed. In one embodiment, the URLs stored in the URL database 146 are categorized.

The gateway server module 120 may also include a policy module 142. The policy module 142 may used to implement network policies regarding how certain content will be handled by the gateway server module 120 or by a firewall or some other security software installed within the network 110. In one embodiment, the policy module 142 may be configured to provide the system guidance on how to handle URL requests for categorized URLs. For example, the gateway server module 120 may be configured to disallow URL requests that are categorized as being "Malicious" or "Spyware." In other embodiments, the policy module 142 may be used to determine how to handle URL requests that have not been categorized. In one embodiment, the system may be configured to block all requests for URLs that are not in the categorized URL/content database 146. The policy module 142 may also be configured to allow certain requests of uncategorized URLs based on the user making the request or the time at which the request is made. This allows the system to avoid having a one-size-fits-all configuration when such as configuration would not meet the business needs of the organization running the gateway server module 120.

The gateway server module 120 may include a collection module 140. The collection module 140 may be a software program, routine, or process that is used to collect data about URLs. In one embodiment, when an internet request is received from the URL request module 136 for content from the syndicated website 115, the collection module 140 may be configured to visit the website associated with the syndicated website 115 and download data to the gateway server module 120 for analysis by components of the gateway server module 120. The downloaded data may also be sent via the Internet 112 for delivery to the database management module 114 (as will be discussed in further detail below).

In some embodiments, the gateway server module 120 may also include a logging database 144. The logging database 144 may perform various functions. For example, it may store records of certain types of occurrences within the network 110. In one embodiment, the logging database 144 may be configured to record each event in which an uncategorized URL is requested by a workstation 116. In some embodiments, the logging database 144 may also be configured to record the frequency with which a particular uncategorized URL is requested. This information may be useful in determining whether an uncategorized URL should be of particular importance or priority and should be categorized by the database management module 114 ahead of earlier received data. In some embodiments, uncategorized URLs may be stored separately in an uncategorized URL database 147.

For example, some spyware may be written to request data from a particular URL. If many workstations 116 within the network 110 are infected with the spyware, repeated requests to a particular URL may provide an indication that some anomaly is present within the network. The logging database may also be configured to record requests of categorized URL data. In some embodiments, categorizing requests of categorized URLs may be helpful in determining whether a particular URL has been mischaracterized.

Referring now to FIG. 4, an example of the logging database 144 is discussed. The logging database 144 includes four columns of data. The first column, "No. Page Requests" 152 is indicative of the number of times a particular URL has been requested by users within the network 110. The second column "URL" 154 records the particular URL string that is being logged in the logging database 144. Thus, when a URL is sent to the logging database 144, the database may first be searched to determine whether the URL string is already in it. If not, then the URL string may be added to the database. In some embodiments, the collection module 140 may be configured to visit the requested URL and gather data about the URL. The collection module 140 may retrieve the page source of the requested URL and scan it for certain keywords that may indicate a type of content. For example, if the page source includes "javascript://" then the page may be identified as having JavaScript. While such content is not inherently dangerous, a web page with JavaScript may have a greater chance of including malicious content designed to exploit how a browser application handles JavaScript function calls. In some embodiments, this data may be stored in the logging database 144 in JavaScript column 155. The logging database may also receive similar information from pages that include Active-X content and store that content within Active X column 156. In other embodiments, other types of active content may be detected and stored for java applets, VBScript, and the like.

Referring again to FIG. 3, the gateway server module 120 may further include an IT interface module 148. The interface module 148 may be used to allow network administrators or other technical personnel within an organization to configure various features of the gateway server module 120. In certain embodiments, the interface module 148 allows the network administrator or some other network management-type to configure the policy module 142.

The gateway server module 120 may further comprise a URL analysis module 149. The URL analysis module 149 is configured to analyze URLs based on the URL and data associated with the URL. Data associated with a URL may include reputation data. Examples of web reputation data include data associated with the URL host and the URL host nameserver. Additional examples of web reputation data are discussed below with reference to the URL analysis module 149.

The gateway server module 120 may also include a content filtering module 150. The content filtering module 150 may work in conjunction with the policy module and the categorized URL/content database 146 to filter portions of search results returned in response to a network request. In one embodiment, the content filtering module 150 may be configured to remove URL links and other content from a list of URLs returned in response to a user query sent to an Internet search engine 113. By way of example and not of limitation, the content filtering module 150 may be configured to recognize an outgoing search engine query. A page returned by the search engine 113 to the client workstation 116 may be intercepted by the gateway server module 120 and analyzed by the content filtering module 150. The content filtering module 150 may be configured to parse the returned page and identify URL links in the returned search results and embedded items of content such as images or active content.

Each identified URL link or item of content may be compared to the data in the URL/content database 146 to determine if the URL link has already been categorized. If it has been categorized, the policy module is consulted for instructions on how to handle the content. For example, the policy module 142 may instruct the content filtering module 150 to remove URL links that lead to web pages that are categorized as being "Malicious" or "Spyware." In addition, the content filtering module 150 may also be configured to remove objectionable content from the returned search engine results based on the presence and categorization of the content in the URL/content database 146. In one embodiment, the content filtering module 150 may be configured to filter content based on information provided by the URL analysis module 149.

Referring now to FIG. 5, an example of a URL access policy database 158 is provided. The URL access policy database 158 may be used by the policy module 142 to implement policies for accessing web-based content by workstations 116 within the network 110. In the embodiment shown the URL access policy database 158 includes a table with four columns. The first column is a user column 160. The "User" column 160 includes data about the users that are subject the policy defined in a given row of the table. The next column, "Category" 162, lists the category of content to which the policy defined by that row is applicable. The third column, "Always Block" 164 represents the behavior or policy that is implemented by the system when the user and category 162 of requested content match the user and category as defined in that particular row. In one embodiment, the "Always Block" field may be a Boolean-type field in which the data may be set to either true or false. Thus, in the first row shown in the data table, the policy module 142 is configured to "always block" requests for "malicious content" by user "asmith."

As noted above, the policy module 142 may also be configured to implement policies based on different times. In the embodiment provided in FIG. 5, the fourth column "Allowed Times" 166 provides this functionality. The second row of data provides an example of how time policies are implemented. The user 164 is set to "bnguyen" and the category 162 is "gambling." The policy is not configured to "always block" gambling content for "bnguyen," as indicated by the field being left blank. However, the time during which these URL requests are permitted is limited to from 6 PM to 8 AM. Thus, adopting these types of policies allows network administrators to provide a certain degree of flexibility to workstations and users, but to do so in a way that network traffic is not compromised during typical working hours.

In one embodiment, the URL analysis module 149 may be configured to examine requested URLs, e.g., URLs not previously categorized and generate a score or other data indicative of whether the URL is likely to reference targeted (e.g., active) content. In one embodiment, the URL analysis module 149 may comprise a reputation scoring module (such as an embodiment of the reputation scoring module 331 of FIG. 12) that generates a score or other data representative of a reputation of the URL.

When located within the gateway server module 120, the reputation scoring module of the URL analysis module 149 may directly analyze the reputation of the URL using local data and databases to determine a score with minimal latency. The reputation scoring module may communicate with one or more databases of the database management module 114 (see FIG. 1) to obtain additional information about the URL or components of the URL for determining a score for the URL.

The URL analysis module 149 need not include the reputation scoring module and instead may rely upon a remotely located reputation scoring module. For example, a reputation scoring module 331 may be located at the database management module 114 as is illustrated in the embodiment of the database management module 114 in FIGS. 7 and 12. The URL analysis module 149 communicates the requested URL to the database management module 114 for scoring by the remotely located reputation scoring module 331. The database management module 114 communicates the results of the analysis performed by the reputation scoring module 331 back to the gateway sever module 120. The gateway server module 120 may rely upon the results received from the database management module 114 to determine under what conditions the user will be allowed access to the website associated with the requested URL. The gateway server module 120 may further rely upon a predetermined policy associated with the user when determining whether access will be allowed. Advantageously, a remotely located reputation scoring module may be shared by multiple gateway server modules 120. A remotely located scoring module may reduce the complexity of the software needed at the gateway server module 120.

In other embodiments, the functionality of the reputation scoring module may be shared between the gateway server module 120 and the database management module 114. Such an arrangement may provide benefits to the latency of the scoring process while still providing the benefit of shared access.

For example, a higher reputation score may be indicative of the likelihood that the website associated with the URL does not include active content. URLs that are uncategorized might still have a high reputation score if the host internet protocol (IP) address of the URL is the same (e.g., the hostname is merely an alias) as a host IP for which categorized URLs are not associated with active or other targeted content. Conversely, if the host IP address is the same as a host IP address that is associated with active or other targeted content, the reputation score may be low. Of course, depending on the embodiment, different score ranges, or different interpretations of scores (e.g., high scores indicative of a bad URL reputation) may be used.

It is to be recognized that data or a score indicative of the reputation of a URL may be based on one or more different data elements and analysis. Examples of ways of generating reputation scores are discussed below with reference to a reputation scoring module illustrated in FIG. 12. The URL analysis module 149 may use one or more of the reputation scoring techniques described with reference to FIG. 12 to generate a URL a score or other indicator of reputation.

A score indicative of a reputation may be generated for a URL requested by a user or for a URL requested by a proxy on behalf of the user. For example, applications such as web feed readers or other types of content aggregators collect data on behalf of a user through a single aggregating URL. Well known examples of these types of applications include Google Reader, http://www.mynewsbot.com/, MyYahoo!, NewsGator and the like. These types of applications typically allow a user of the workstation 116 to designate or "subscribe" to various external web sites that offer syndicated content. The web feed reader or aggregator visits each of the websites or URLs subscribed to by the user and gathers the syndicated content from the visited websites. Examples of known web feed protocols for gathering or aggregating syndicated content include RSS and ATOM. The syndicated content is often delivered to the aggregating website and displayed to the user under the aggregating protocol's URL. The aggregated content may be delivered to the aggregating website, for example, in the form of an XML package and includes URLs associated with the websites from where the content was gathered.

Unlike the website URLs, the aggregating protocol's URL under which the content is displayed is not specific to the user or to the gathered content. For example, content aggregated by yahoo's web feed reader is displayed under the URL "http://my.yahoo.com". Because the single aggregating URL, such as "http://my.yahoo.com", is not specific to the user or gathered content, in one embodiment, the reputation scoring module 331 does not rely exclusively upon the aggregating URL to determine one or more reputation scores for the website URLs. In such an embodiment, the reputation scoring module 331, whether residing within or remote from the gateway server module 120, preferably relies upon an analysis of the website URLs associated with the gathered content to generate reputation scores. In one embodiment, the content filtering module 150 provides the website URLs associated with the gathered content to the URL analysis module. Each reputation score may then be unique to each website URL and relied upon by the gateway server module 120 to determine under what circumstances, if any, the user will be allowed to access the content associated with each scored website URL gathered by such types of web feed reader applications.

The gateway server module 120 may apply this same process to a listing of URLs returned in response to a search engine request. The gateway server module 120 analyzes each of the returned URLs to generate reputation scores. Each reputation score may then be unique to each listed URL and relied upon by the gateway server module 120 to determine under what circumstances, if any, the user will be allowed to access the content associated with each scored URL listed by the search engine.

The gateway server module 120 may also apply these technique to interactive websites and content. For example, in developing the web into more of a communication platform, several web properties are allowing interactive content uploads by end-users. Examples include, but are not limited to, MySpace, FaceBook, GooglePages, etc. The content on these sites is often based on active technologies such as JavaScript, XML, and Ajax. To analyze these types of pages and content, the gateway server module 120 may rely at least in part on the top-level category of the domain in combination with the analysis by the reputation scoring module 331 of the content and referenced links on the website.

The URL analysis module 149 may provide its score to the policy module 142. The policy module 142 can be configured to implement different policies depending on the score, the user, or any other applicable parameters. Thus, in one embodiment, the URL analysis module 149 may generate a sufficiently high reputation score (e.g., indicative of a good reputation or low likelihood of active or other targeted content) for an uncategorized URL so that the policy module 142 allows access to the uncategorized URL when the policy module 142 would otherwise not allow access to the URL. Alternatively, the policy module 142 may be configured to block access to URLs with low scores (e.g., indicative of poor reputation or higher likelihood of active or other targeted content) where the applicable policy might otherwise allow access to the URL.

FIGS. 6A and 6B provide illustrations of how the categorized URL database 146 may store categorized data. In one embodiment, the categorized URLs may be stored in a two-column database table such as the one shown in FIG. 6A. In one embodiment, the table may include a URL column 172 which may simply store the URL string that has been characterized. The Category column 174 may store data about the how that URL has been characterized by database module 114 (as will be described in detail below). In one embodiment, the URL field may be indexed so that it may be more quickly searched in real time. Because the list of categorized URLs may reach well into the millions of URLs, a fast access routine is beneficial.

Referring now to FIG. 6B, the table of uncategorized URLs 147 is provided (described earlier in connection with FIG. 3). This table may be populated by URL requests from the workstation 116 which request URLs that are not present in the categorized URL/content database 146. As will be described in greater detail below, the gateway server module 120 may be configured to query the categorized URL/content database 146 to determine whether a requested URL should be blocked. If the requested URL is in the categorized database 146, the policy module may determine whether to allow the request to proceed to the internet 112. If the requested URL is not found in the categorized URL/content database 146, however, it may be added to the database 147 of uncategorized URLs so that it may be sent to the database management module 114 via the Internet 112 and later analyzed and categorized and downloaded into the database of categorized URLs 146.

Figure 7:
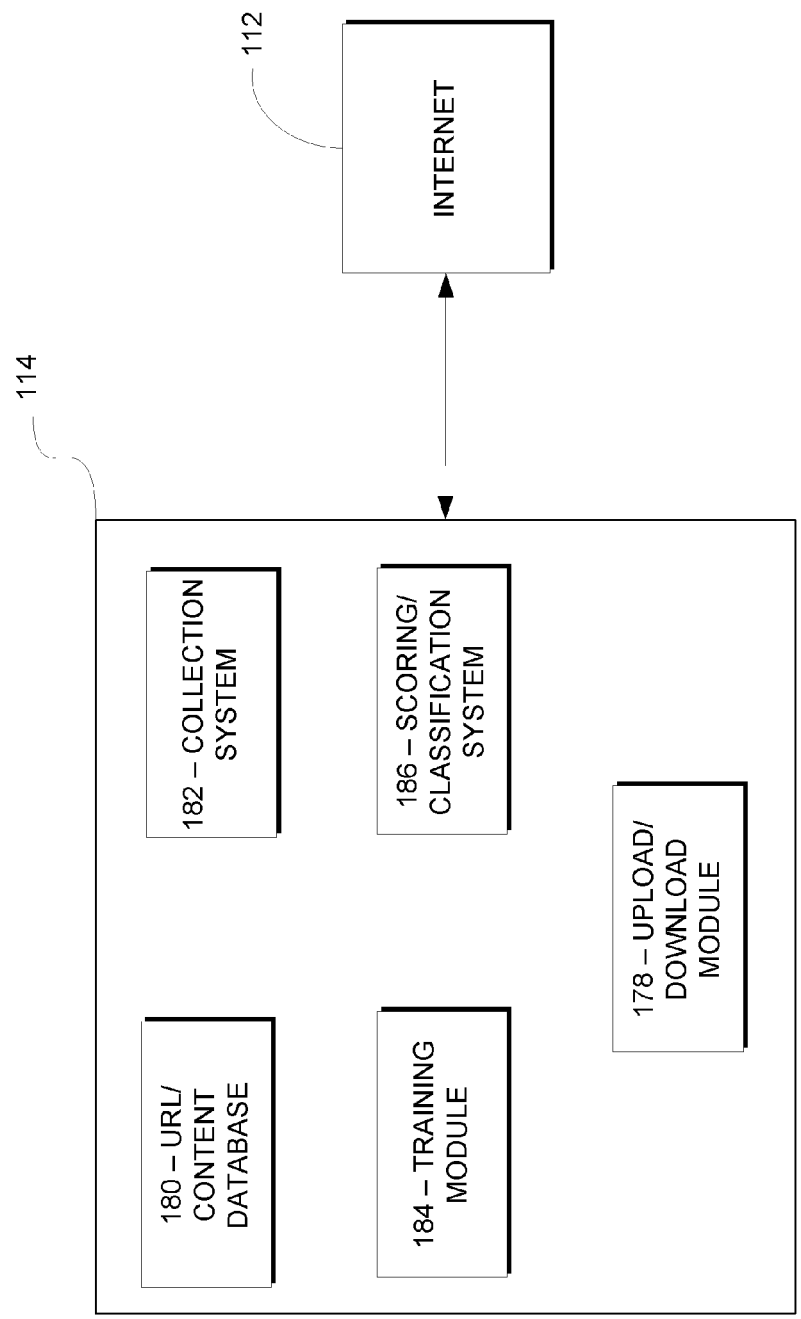
FIG. 7 is a block diagram of a database management module from FIG. 1.

FIG. 7 is an illustration of various components that may be included in the database management module 114. As discussed above, the database management module 114 may be located remotely (accessible via Internet 112) from the network 110 and its associated workstations 116. The database management module may take the form of one or many different hardware and software components such as a server bank that runs hundreds of servers simultaneously to achieve improved performance.

In one embodiment, the database management module 114 may include an upload/download module 178. The upload/download module 178 may be a software or hardware component that allows the database management module 114 to send and receive data from the Internet 112 to any number of locations and may, depending on the embodiment, operate in a substantially similar manner as the upload/download module 134 on the gateway server module 120. In one embodiment, the upload/download module is configured to send newly categorized URLs to gateway server modules 120 on the Internet 112 for addition to their local categorized URL/content databases 146.

The database management module 114 may also include a database management module URL/content database 180. The database management module URL/content database 180 may take the form of a data warehouse which stores URL strings and information about URLs that have been collected by a collection system 182 which will be described in further detail below. The database management module URL/content database 180 may be a relational database that is indexed to provide quick and effective searches for data. In certain embodiments, the URL/content database 180 may be a data warehousing application which spans numerous physical hardware components and storage media. The URL/content database 180 may include data such as URL strings, the content associated with those strings, information about how the content was gathered (e.g., by a honey client, by a customer submission, etc.), and possibly the date in which the URL was written into the URL/content database 180.

The database management module 114 may further include a training system 184. The training system 184 may be a software/hardware module which is used to define properties and definitions that may be used to categorize web-based content. The database management module 114 may further provide a scoring/classification system 186 which utilizes the definitions and properties created by the training system 184 to provide a score or classification (e.g., a categorization) to web content so that the categorization may be delivered via the upload/download module 178 to gateway server modules 120.

Figure 8:
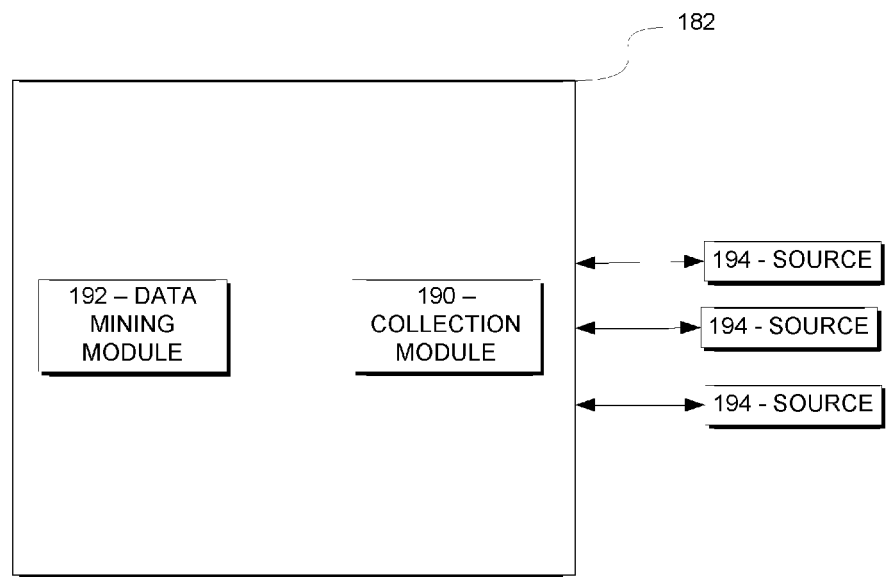
FIG. 8 is a block diagram of a collection system from FIG. 7.

With reference now to FIG. 8, a more detailed view of the collection system 182 is provided. The collection system 182 may include a database management collection module 190 which is coupled (either directly or indirectly) to a data mining module 192. The database management collection module 190 may be used by the database management module 114 to collect data for the URL/content database 180 about URLs that have not been categorized. The database management collection module 190 may also be used to collect URLs for additional analysis by other system components. The database management collection module 190 may be associated with one or more collection sources 194 from which it may collect data about URLs. Collection sources 194 may take various forms. In some embodiments, the collection sources 194 may include active and passive honeypots and honey clients, data analysis of logging databases 144 stored on the gateway server module 120 to identify applications, URLs and protocols for collection. The collection sources 194 may also be webcrawling applications that search the Internet 112 for particular keywords or search phrases within page content. The collection sources 194 may also include URLs and IP addresses data mined from a DNS database to identify domains that are associated with known malicious IP addresses. In some embodiments, URLs for categorization may be collected by receiving malicious code and malicious URL samples from other organizations who share this information. In yet other embodiments, URLs may be collected via e-mail modules configured to receive tips from the public at large, much in the way that criminals are identified through criminal tip hotlines.

Figure 9:
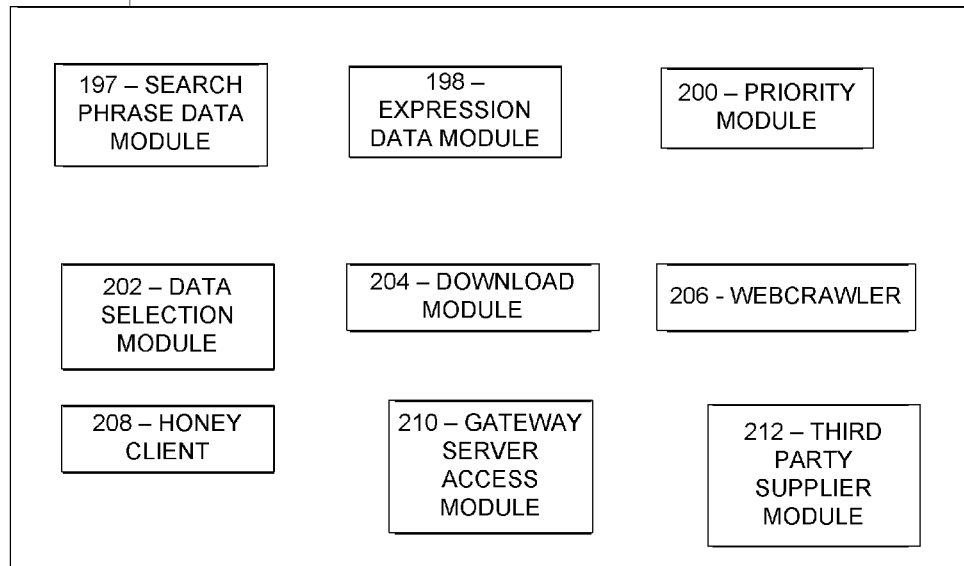
FIG. 9 is a block diagram of a collection module from FIG. 8.

Referring now to FIG. 9, a more detailed view of the database management collection module 190 is provided. The database management collection module 190 may include various subcomponents that allow it to effectively utilize each of the collection sources 194 described above. The database management collection module 190 may include a search phrase data module 197 and an expression data module 198. The search phrase data module 197 collects and provides search phrases that may be relevant to identifying inappropriate content. The expression data module 198 may include various types of expressions such as regular expressions, operands, or some other expression. The search phrase data module 197 and the expression data module 198 each may include updateable record sets that may be used to define the search parameters for the web crawling collection source 194. The database management collection module 190 may also include a priority module 200. The priority module 200 may take the form of a software process running within the collection system 182, or it may run as a separate process. The priority module may be used to prioritize the data collected by the database management collection module in order to have more potentially dangerous or suspect URLs (or data) receive close inspection prior to the likely harmless URLs. In one embodiment, the priority module 200 may assign priority based on the collection source 194 from which the URL is received. For example, if a URL is received from a customer report, it may be designated with a higher priority. Similarly, if the URL is received from a web crawler accessing a domain or IP address or subnet known to host malicious content in the past, the URL may receive a high priority. Similarly, a potentially dangerous website identified by a honey client (discussed in further detail below) may also receive a high priority. The database management collection module 190 may also include a data selection module 202 which may work with the priority module 200 to determine whether identified URLs should be tagged as candidate URLs for categorization. In one embodiment, the data selection URL may provide a user interface for receiving search parameters to further refine the prioritized data by searching for data based on priority and content.

As indicated above, the collection module may also include a data download module 204. The data download module 204 may be configured to identify URLs to visit and to download data and content from the visited URLs. The data download module 204 may work in conjunction with various subsystems in the database management collection module 190 to retrieve data for the URL/content database 180. One such subsystem is the webcrawler module 206. The webcrawler module 206 may be a software application configured to access websites on the Internet 112 by accessing web pages and following hyperlinks that are included in those pages. The webcrawler module 206 may be configured with several concurrent processes that allow the module to simultaneously crawl many websites and report the visited URLs back to the database management module URL/content database 180 as will be discussed in further detail below. The database management collection module 190 may also include a honey client module 208. The honey client module 208 is a software process configured to mimic the behavior of a web browser to visit websites in such a manner that is inviting to malicious code stored within the visited pages. The honey client module 208 may visit the web sites and track the behavior of the websites and download the content back to the URL/content database 180 for further analysis.

The database management collection module 190 may also include a third party supplier module 212 which is configured to receive URLs and associated content from third parties. For example, the third party module 212 may be configured to provide a website which may be accessed by the general public. The module may be configured to receive an input URL string which may then be entered into the URL/content database 180. In some embodiments, the third party module may also be configured to receive e-mails from private or public mailing lists, and to identify any URL data embedded within the e-mails for storage in the URL/content database 180.

The database management collection module 190 may also include a gateway server access module 210. The gateway server access module is a software component or program that may be configured to regularly access the logging database 144 on the gateway server module 120 to download/upload all of the newly uncategorized web content identified by the logging database 144.

Referring back to FIG. 8, the collection system 182 may also include a data mining module 192. The data mining module 192 may be used to obtain additional data about URLs stored in the database management module's URL/content database 180. In many instances, the information supplied by the collection sources 194 to the database management collection module 190 and URL/content database 180 is limited to nothing more than a URL string. Thus, in order for the system to effectively categorize the content within that URL, more data may be necessary. For example, the actual page content may need to be examined in order to determine whether there is dangerous content embedded within the URL. The data mining module 192 is used to collect this additional necessary data about the URLs, and will be discussed in further detail below.

Figure 10:
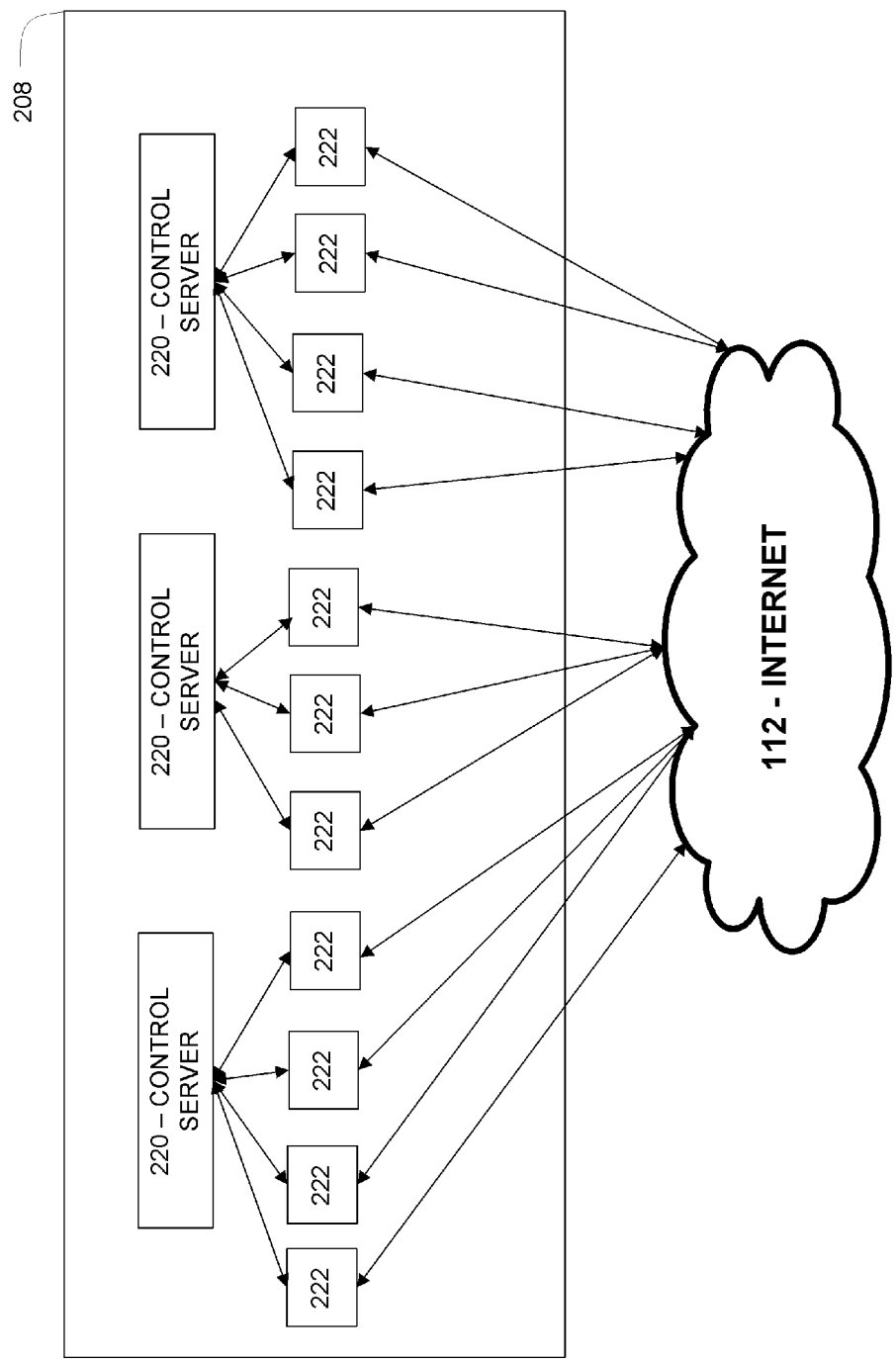
FIG. 10 shows a honey client system according to some aspects of the invention.

FIG. 10 provides a more detailed view of a honey client system 208. The honey client system 208 includes control servers 220. The control servers 220 are used to control a plurality of honey miners 222 which are configured to visit web sites and mimic human browser behavior in an attempt to detect malicious code on the websites. The honey miners 222 may be passive honey miners or active honey miners. A passive honey miner is similar to a web crawler as described above. However, unlike the web crawler above which merely visits the website and reports the URL links available from that site, the passive honey miners may be configured to download the page content and return it to the control servers 220 for insertion into the URL database 180. The honey miners 222 may be software modules on a single machine, or alternately, they may be implemented each on a separate computing device.

In one embodiment, each control server may control 17 passive honey miners 222. The control servers 220 may extract or receive URLs from the URL database 180 which need additional information in order to be fully analyzed or categorized. The control servers 220 provide the URLs to the miners which in turn review the URLs and store the collected data. When a passive miner 222 is finished with a particular URL, it may request another URL from its control server 222. In some embodiments, the miners 222 may be configured to follow links on the URL content so that in addition to visiting URLs specified by the control server 220, the miners may visit content that it linked to those URLs. In some embodiments, the miners 222 may be configured to mine to a specified depth with respect to each original URL. For example, the miners 222 may be configured to mine down through four layers of web content before requesting new URL data from the control server 220.

In other embodiments, the control servers 220 may be configured to control active honey miners 222. In contrast to the passive honey miners which only visit web sites and store the content presented on the sites, the active honey miners 222 may be configured to visit URLs and run or execute the content identified on the sites. In some embodiments, the active honey miners 222 include actual web browsing software that is configured to visit websites and access content on the websites via the browser software. The control server 220 (or the honey miners themselves 222) may be configured to monitor the characteristics of the honey miners 222 as they execute the content on the websites they visit. In one embodiment, the control server 220 will record the URLs that are visited by the honey miners as a result of executing an application or content on the websites visited. Thus, active honey miners 222 may provide a way to more accurately track system behavior and discover previously unidentified exploits. Because the active honey miners expose themselves to the dangers of executable content, in some embodiments, the active honey miners 222 may be located within a sandbox environment, which provides a tightly-controlled set of resources for guest programs to run in, in order to protect the other computers from damage that could be inflicted by malicious content. In some embodiments, the sandbox may take the form of a virtual machine emulating an operating system. In other embodiments, the sandbox may take the form of actual systems that are isolated from the network. Anomalous behavior may be detected by tracking in real-time, changes made to the file system on the sandbox machine. In some embodiments, the code executed by the active honey miners 222 may cause the machine on which they are running to become inoperable due to malicious code embedded in the webpage content. In order to address this issue, the control server may control a replacement miner which may step in to complete the work of a honey miner 222 which is damaged during the mining process.

Referring now to FIG. 11, an example of a set of URL-related data that has been collected by the collection system is provided. Although a particular example of collected data is provided, one of skill in the art will appreciate that other data might be collected in addition to the data provided in this example. Included in the collected data is an IP address 230 for the URL. The IP address 230 may be used to identify websites that are hosting multiple domains of questionable content under the same IP address or on the same server. Thus, if a URL having malicious content is identified as coming from a particular IP address, the rest of the data in the URL/content database 180 may be mined for other URLs having the same IP address in order to select them and more carefully analyze them. The collected URL data may also include a URL 232 as indicated by the second column in FIG. 11. In instances where the data is collected using a mining process such as the honey client process described above, the URL 232 may often include various pages from the same web domains, as the miners may have been configured to crawl through the links in the websites. The collected data may also include the page content 234 for a particular URL. Because the content of a URL may be in the form of graphics, text, applications and/or other content, in some embodiments, the database storing this URL data may be configured to store the page content as a binary large object (blob) or application objects in the data record. However, as some web pages contain text exclusively, the page content 234 may be stored as text as well. In some embodiments, the collection routine may be configured to determine whether the URL contains executable content. In these instances, the resultant data set of collected data may include an indication of whether the URL has executable content 236 within its page code. This information may be later used in selecting data from the URL/content database 180 as candidate data for analysis.

Figure 12:
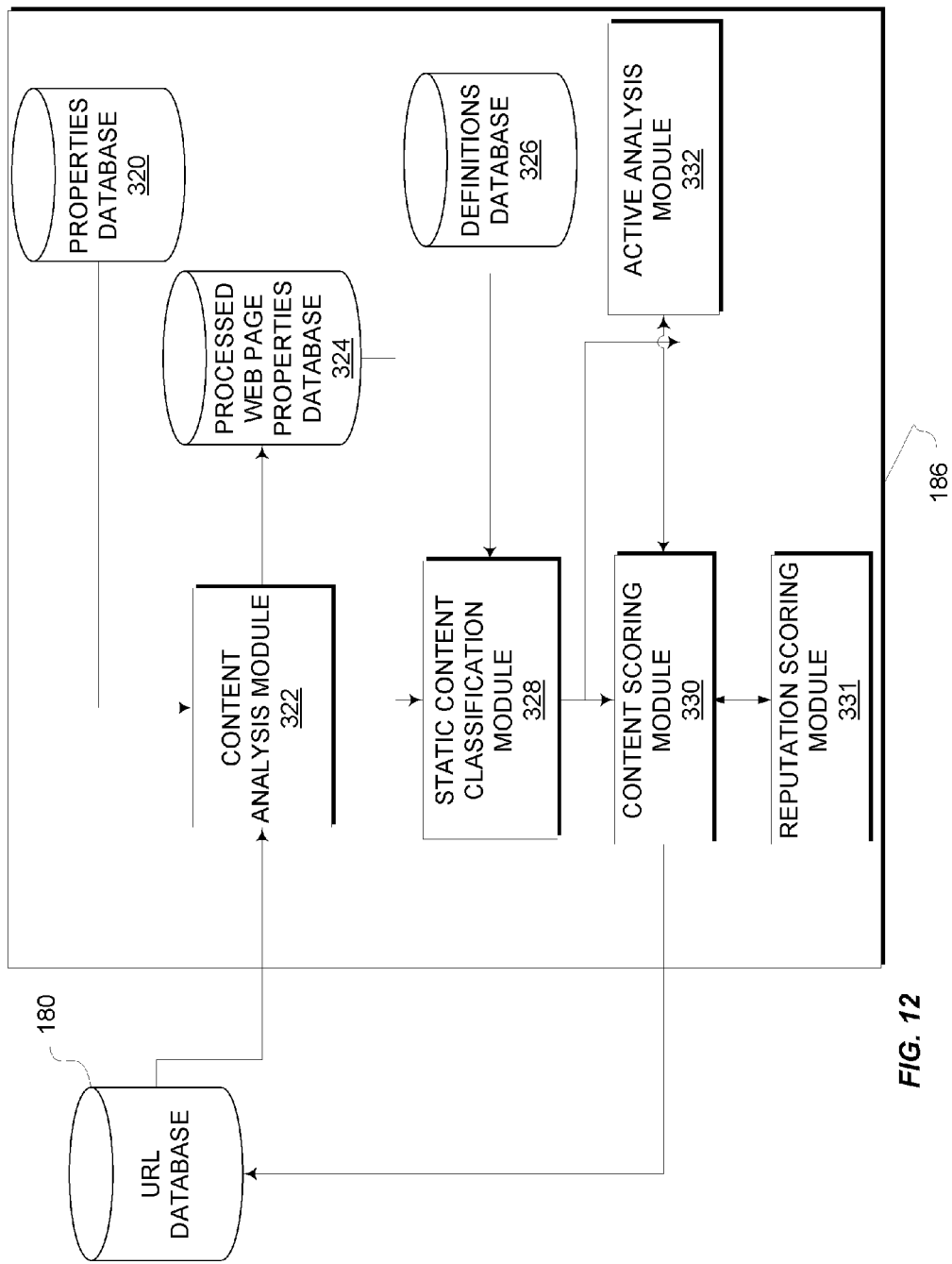
FIG. 12 is a block diagram illustrating a scoring and categorization module from FIG. 7.

FIG. 12 is a block diagram illustrating the scoring and categorization system 186 from FIG. 7. In one embodiment, the scoring and categorization module 186 includes a properties database 320, a processed web page properties database 324, a definitions database 326, a static content classification module 328, a content scoring module 330, and a reputation scoring module 331. In one embodiment, the scoring and categorization system 186 includes an active analysis module 332. The content analysis module 322 receives one or more candidate URLs from the URL database 180 and identifies properties from the properties database 320 that it finds associated with each candidate URL. The values and/or counts of the properties for each URL are stored in the processed web page properties database 324. The static content classification module 328 queries the processed web page properties database 324 based on definitions from the definitions database 326 to associate categories with the candidate URLs. The content scoring module 330 may further associate a score with each URL that can be used to further categorize or to change the categories identified by the static content classification module 328. In one embodiment, the content scoring module 330 may identify candidate URLs for processing by the active analysis module 332. The active analysis module 332 downloads and executes any active content to identify behavior properties associated with the URL. These properties may then be provided to the content scoring module to further categorize the candidate URLs, e.g., change their categories, or add additional categories.

For example, a URL that is processed by the content analysis module 322 may receive a "malicious" category. The content scoring module 330 may then associate a score, e.g., a low score, with the URL that is indicative of the URL not being malicious. To resolve, the content scoring module 330 may provide the URL as a candidate URL to the active analysis module 332 to identify further properties or a behavior score that can be used by the content scoring module 330 to determine whether the "malicious" category is appropriate.

The properties database 320 includes keywords, regular expressions, and other web page properties that can be used to categorize web pages. Properties may also be values associated with the web page such as HTTP request header data or other meta data associated with the web page. For example, properties may includes keywords to be identified in the document such as "<javascript>," "<object>," regular expressions such as "data=.*\.txt" (e.g., the keyword "data=" followed by an arbitrary length string followed by ".txt"), or the content-type of the data from the HTTP header. FIG. 13A is an example of a properties database that includes the property and an additional field identifying the type of property, e.g., a keyword or a regular expression. In the illustrative database, a property ID field is used to provide a unique (within the database) identifier for each property. In other embodiments, other suitable types of keywords may be used.

In one embodiment, the content analysis module 322 receives candidate URLs from the URL database 180 that have been identified by the collection system 182. The content analysis module receives the content and other data associated (such as the HTTP header) with the URLs and identifies one or more of the properties in the properties database 320 that are associated with the candidate web pages and stores data relating to those properties in the processed web page properties database 324. The content analysis module 322 may receive the content of the candidate web pages from the URL database or it may download the data itself. In one embodiment, the honey client module 208 obtains and stores the content of each candidate web page in the URL database. In another embodiment, the content analysis module 322 downloads the content of the candidate web pages as part of processing the web page for properties.

In general, the properties database 320 stores the properties and sufficient information to identify the properties associated with a web page. For example, for keyword or regular expression properties, the properties database 320 may store the keyword or regular expression. In contrast, the processed web page properties database 324 may store counts of the keyword or regular expression found to be associated with each web page by the content analysis module 322. For regular expressions, depending on the embodiment, either a count of matching expressions or the matching expressions themselves, or both may be stored in the processed web page properties database 324. For example, for a particular web page, the processed web page properties database 324 might store the value 3 referring to the number of times that the property "<javascript>" appears in the page, 0 for the number of times the property "<object>" appears, and "data=http://www.example.url/example.txt." for the regular expression property "data=.*\.txt."

FIG. 13B illustrates one embodiment of table in the processed web page properties database 324 in which the example properties of FIG. 13A have been processed with respect to several web pages. In the illustrated embodiment, the database includes two tables, one relating URLs to unique (within the database) identifiers and a second relating the URL identifiers with properties associated with that URL. In the illustrated embodiment, the table includes an entry or row for each property of the web content data associated with the URL. In one embodiment, the database also includes numeric values for each property/URL corresponding to the keyword properties to indicate the number of times that the particular property was found in the web page. The database, for example in the URL/property table, may also include the actual expression matching a regular expression property for the URL. In one embodiment, the keyword properties can be searched in the page body and in the header or other metadata. In one embodiment, only the page body is searched. In yet another embodiment, the property may be associated with data, e.g., in the properties database 320, that indicates what data to process in identifying the property in a web page.

In one embodiment, the static content classification module 328 accesses web page properties database 324 and compares the properties for one or more web pages with definitions from the definitions database 326. When a web page matches a particular definition, the web page is identified with one or more categories associated with the definition. In one embodiment, these categories are stored in the URL database in association with the URL. In one embodiment, each definition is expressed in terms of one or more properties of the web page. In one embodiment, definitions are expressed as first order logical operations relating one or more of the properties. In one embodiment, terms of the definition are comprised of comparisons between web page properties or between properties and values (including constant values). For example, a definition might include an expression such as "property_1"="property 2" AND occurrences of property_3>5. In addition to comparisons, terms may include other operations on web page properties such as mathematical, string, or any other suitable computational expression. For example, a simple definition can be "data=, *\.txt"="data=xyx333.txt", which matches any web page having as part of its content the string "data=xyx333.txt" (which matches the regular expression property "data=, *\.txt"). More complex definitions may comprise logical operations on the terms. Such logical operations may include AND, OR, NOT, XOR, IF-THEN-ELSE, or regular expression matches on the properties. In one embodiment, the definitions may also include or correspond to database query expressions such as standard SQL database comparison functions and logical operations. In one embodiment, definitions may include executable code such as scripts or references to executable programs or scripts that at least partially determine a classification for a URL. FIG. 13C illustrates an exemplary portion of a definitions database 326 according to one embodiment. As used herein, categories can refer to any type of classification. For example, a category may be merely a classification that indicates that further processing or analysis be performed for the URL to identify a category for the URL.

In one embodiment, the content scoring module 330 further analyzes web pages and assigns a score to the web page associated with one or more categories. In one embodiment, the score may be based on a weighted combination of the number of times that keywords are found in the web page. In one embodiment, the weights are stored in the properties database in association with the corresponding property. In one embodiment, the content scoring module 330 communicates such URLs to the active analysis module 332 for additional analysis.

In one embodiment, the content scoring module 330 bases the score at least partly on a reputation score generated by the reputation scoring module 331. In one embodiment, the reputation scoring module 331 may be configured to associate a score with a URL based on information about the URL, including URL components such as the URL scheme (e.g., "http:"), the host (e.g., www.uspto.gov), the path (e.g., "index.html"), the query (e.g., the portion following a "?"), and the fragment (the portion following a "#"). The reputation scoring module 331 may generate the scores based on information about the URL of the web page (e.g., scoring criteria) such as one or more of URL content strings, Geo-location data associated with the URL (e.g., the URL host or host domain), the name server that provides the IP address of the URL host or its domain, the network or blocks of IP addresses associated with the host IP address or its domain, active content previously identified with reference to the host, the hosts' domain, or the URL path, historical data associated with the IP address of the URL host, creation date or expiration date associated with the registration of the URL host, whether search engine results exist for the URL or the URL host, certificate details associated with the URL (e.g., for secure (such as HTTPS) access schemes), meta tag categories associated with other URLs associated with the URL host (e.g., such as in the URL database 180 or the processed web page properties database 324), categories associated with other URLs of the URL host (e.g., in the URL database 180), a fingerprint (e.g., a digest or hash) associated with the content of the URL for comparison to such data of previously categorized URLs (and to generate reputation data depending on whether URLs with the same fingerprint had targeted content), and scoring based on site (host or domain) access statistics (e.g., generate higher reputation scores for frequently visited sites than for infrequently visited sites because frequently visited sites (for other URLs that do not have targeted content) are less likely to have targeted content in newly visited URLs). In one embodiment, the reputation scoring module 331 may generate a score that comprises a weighted average of one or more such criteria. It has been found that URLs having targeted content are more likely to include machine generated, random or other strings that do not conform to word formation rules, in order to avoid such content from being easily identified by the inclusion of known (disreputable) URL strings. Thus, in one embodiment, the reputation scoring module 331 compares URL strings to dictionary words or to word formation rules and generates at least a partial score based on this comparison. In addition to scanning for keywords, the URL string (or substring) may be compared to a word (or, more generally, a concatenation of one or more words) from a dictionary to help determine whether the URL string includes words or appears to be a random, machine generated, include sequences of escaped (e.g., % escaped) characters, or include long nonsense strings (e.g., www.XXXXXXxxxxxxxxxxxxyyyyyyyyyyyyyyzzzzzzzzzz zzzzzzzzzzzzzz.com). In one embodiment, dictionaries for one or more languages may be used. Word formation rules may be any set of rules associated with words in a particular language. For example, in one embodiment, a simple word formation rule may identify strings of consonants or vowels that exceed a specified threshold (e.g., four) in length are unlikely to be a word. More sophisticated word formation rules may also be used that generate scores based on unlikely combinations of letters (e.g., xqv in English) in the URL string. For example, in one embodiment, a suitable information theoretic measure of information content such as information entropy may be calculated for one or more component of the URL, the URL, and/or content of the URL. Because strings containing random information tend to have a higher entropy measure, randomly generated data associated with a URL can be identified by scoring the URL based on entropy or by comparing the entropy, or entropy relative to length, of data associated with a URL (URL components, the URL string, and/or content of the URL) to a threshold.

It has been found that certain combinations of the scoring criteria are particularly useful for identifying active or other target content because, for example, the set of criteria covers a number of different ways that targeted active content might be created to avoid detection. Thus, in one example embodiment, the URL score combines scoring criteria including an entropy score, a score based on historical data associated with the URL, search results associated with the URL, and historical data associated with the IP address of the URL.

In one embodiment, the reputation scoring module 331 generates scores based on a database of internet addresses and/or domain names. The reputation scoring module 331 may assign scores to entire subnetworks (e.g., all addresses matching 128.2.*.* may have a particular score). Such networks or subnetworks help identify a web site as being based in a particular country or with a particular service provider. This has been found to be useful in scoring because certain countries and service providers have been correlated with certain types of web content due to different laws or lax enforcement of laws. The scoring system of networks or subnetworks may be based on the relative number of URLs in particular networks or domains that have a particular category. For example, if 95% of the URLs for a particular network in the URL database 180 are classified as having malicious active content, new URLs may be given a score indicative of the likelihood that other URLs referencing servers in the same network are also likely to have such targeted content.

In an embodiment, the reputation scoring module 331 generates an indicator of reputation such as a reputation based on information about the registrar of the site (e.g., the domain name of a URL host). Such registrar information may include, for example, the identity of the registrar, the registrant (including address and contact information of the registrant), when the registrar record was created, when the registrar record was last updated, when the registrar record expires, and any other registrar data including data provided by the WHOIS protocol (e.g., Internet Engineering Task Force (IETF) RFC-3912).

The reputation scoring module 331 may include a database of changes in registrar data of at least a portion of the URLs in the URL database 180. The frequency or recentness of changes to registrar data associated with a URL may be used to at least partly to generate the reputation score. The reputation score for a URL may be generated at least partly by comparing at least part of the registrar data associated with the URL with registrar data of previously categorized URLs.

Hosts of targeted content may attempt to confuse or hide their content from filters by using a multiplicity of host and domain names and by frequently changing IP addresses associated with domains. The reputation scoring module 331 may generate reputation indicator data or scores based on a reputation of the name server which is common to the multiple hosts and domains associated with the name server. For example, the reputation scoring module 331 may include a database of nameservers (servers that provide domain name system (DNS) services to translate Internet host names to IP addresses). Generally, particular servers provide DNS services for a particular domain. Thus, if the nameserver for a URL host is the nameserver for other hosts that have previously been categorized or identified with targeted content, the reputation scoring module 331 may utilize this information when generating a reputation score for the uncategorized URL. For example, if the nameserver is associated with targeted content, the reputation score of the uncategorized URL may be low. The reputation scoring module 331 may also maintain a database of hosts to IP addresses and utilize the database to generate a score based on the frequency with which the IP address changes for a particular host or domain.

In one embodiment, URLs with scores above a threshold are identified with a category, e.g., malicious, regardless of, or in addition to, the category identified by content analysis of the web page. In one embodiment, multiple scores associated with different categories are assigned to each URL, and the categories corresponding to each score above a given threshold are identified with the URL. In one embodiment, multiple thresholds are employed. For example, URLs having scores above one threshold value automatically are classified based on the score. In one embodiment, URLs having scores that are below the first threshold but above a second threshold are communicated to a human analyst for classification.

One embodiment may include a scoring and categorization system such that illustrated in U.S. Pat. No. 6,606,659, entitled "SYSTEM AND METHOD FOR CONTROLLING ACCESS TO INTERNET SITES," which document is incorporated by reference in its entirety.

In one embodiment, the active analysis module 332 executes active content of a web page to identify its behavior properties. These properties may then be used to score and classify the web page. In one embodiment, one or more of the static content classification module 328, the reputation scoring module 331, and the content scoring module 330 identifies URLs for processing by the active analysis module 332. After receiving candidate URLs, the active analysis module 332 may provide a behavioral score or data associated with one or more behavior properties (e.g., a property such as "writes to registry") to the content scoring module for further categorization.

Figure 14:
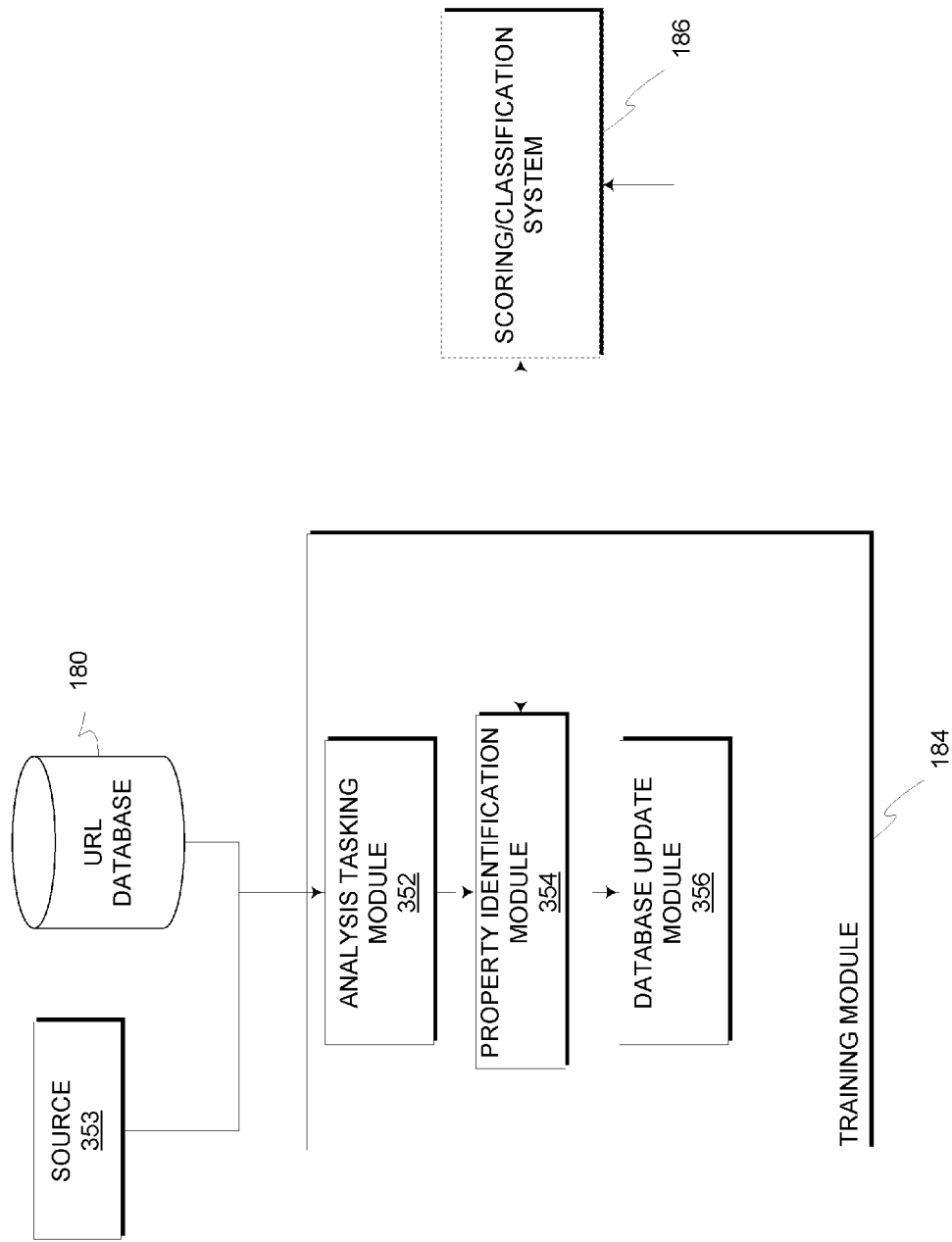
FIG. 14 is a block diagram illustrating one embodiment of a training module from FIG. 7.

FIG. 14 is a block diagram illustrating one embodiment of the training module 184 from FIG. 7. In one embodiment, the training module includes an analysis tasking module 352 that identifies web pages or URLs having content, such as active content, for which additional categories are desired. In one embodiment, the collection module 190 identifies URLs having active content. In another embodiment, an external source, such as security researchers, identify particular URLs having active content that has been identified with one or more categories, e.g., keyloggers, viruses, malicious content, worms, etc. In one embodiment, these may be stored in the URL database 180. In one embodiment, the tasking module 352 maintains a database of such URLs (not shown). In one embodiment, the tasking module 352 database maintains a priority for these URLs and presents them to an analyst based on the priority.

A property identification module 354 identifies properties of the web page and definitions based on those properties that categorize the web page. In one embodiment, the properties identification module 354 provides an interface for a human analyst to apply particular rules or definitions to a URL using the scoring and classification system 186. In addition, in one embodiment, the property identification module 354 may provide an interface for the analyst to identify the URL as a candidate for the active analysis module 332 of FIG. 10 to perform behavioral analysis of the URL to receive additional data for classifying the URL back from the active analysis module 332. The property identification module 354 may then provide this data to the analyst. In one embodiment, the analyst analyzes URL data from the scoring and classification system 186, including the active analysis module 332, to help identify properties and definitions that properly classify the URL and, where possible, other URLs that refer to similarly classified content. In one embodiment, property identification module 354 provides these newly identified properties and definitions to a database update module 356 that stores the new definitions and properties to the properties database 320 and the definitions database 326.

Figure 15:
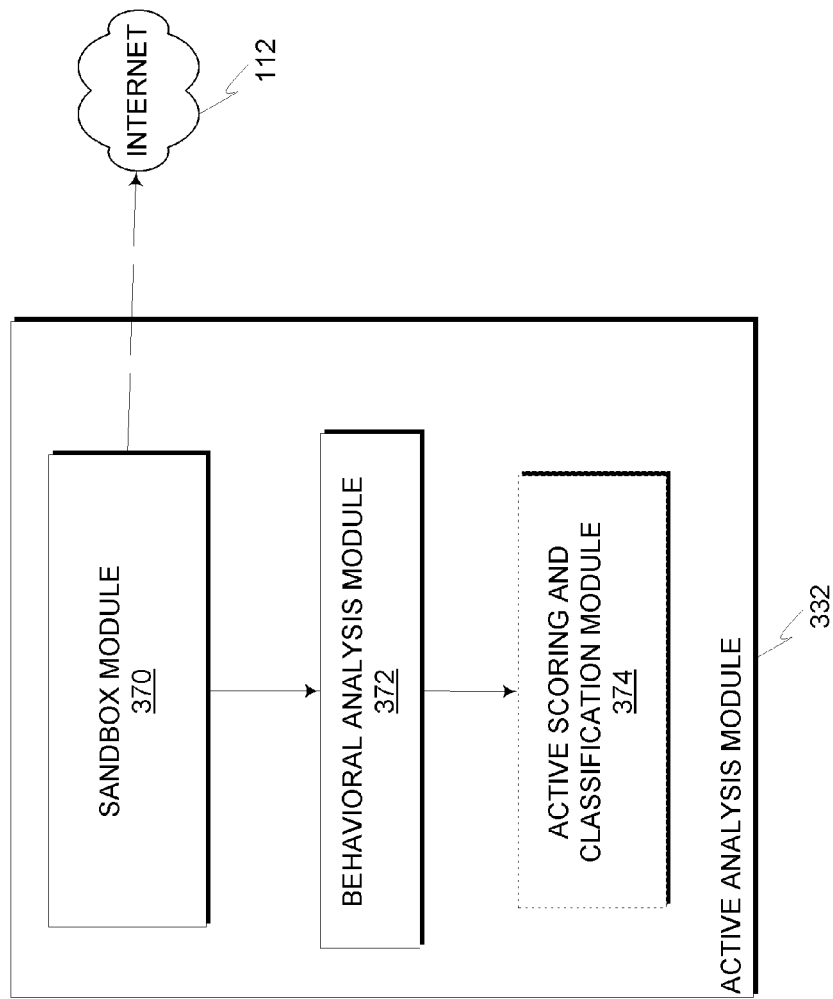
FIG. 15 is a block diagram illustrating one embodiment of an active analysis system from FIG. 12.

FIG. 15 is a block diagram illustrating one embodiment of the active analysis module 332 from FIG. 12. In one embodiment, the active analysis module 332 includes a sandbox module 370 in which URLs are downloaded and any active content executed as would occur on a typical workstation 116. The sandbox module 370 transparently monitors the state of the computer to identify behavior of the web content affecting, for example, one or more of spawned processes, network access, processor usage, memory usage, use of system resources, file system access or modification, and registry access or modification.

A behavioral analysis module 372 compares the monitored actions from the sandbox module with a list, a database, or rules that characterize the monitored actions. In one embodiment, these characterizations define properties of the URL that are subsequently analyzed by the static content classification module 328 of FIG. 12. In another embodiment, an active scoring classification module 374 may use scores associated with behavioral properties to determine a score for the URL. In one embodiment, the score is a weighted score of these properties. This score may be used to classify the URL or be communicated to the content scoring module for classification. In another embodiment, rules or definitions, such as those from the definitions database 326 are applied to the behavioral properties of the URL (and, in one embodiment, the processed web page properties 324) to identify one or more categories associated with the URL. In one embodiment, the score of a URL may be at least partly based on identified categories of other URL references within the content of the URL. For example, if the site is unclassified but all the identified categories for the reference (e.g., using an HTML HREF element) are malicious, then the URL may be given a score indicative of the malicious content.

Description of Methods of Use and Operation

Depending on the embodiment, the acts or events of the methods described herein can be performed in different sequences, can be merged, or can be left out all together (e.g., not all acts or events are necessary for the practice of the method), unless the text specifically and clearly states otherwise. In addition, the methods described herein can include additional acts or events unless the text specifically and clearly states otherwise. Moreover, unless clearly stated otherwise, acts or events may be performed concurrently, e.g., through interrupt processing or multiple processors, rather than sequentially.

Figure 16:
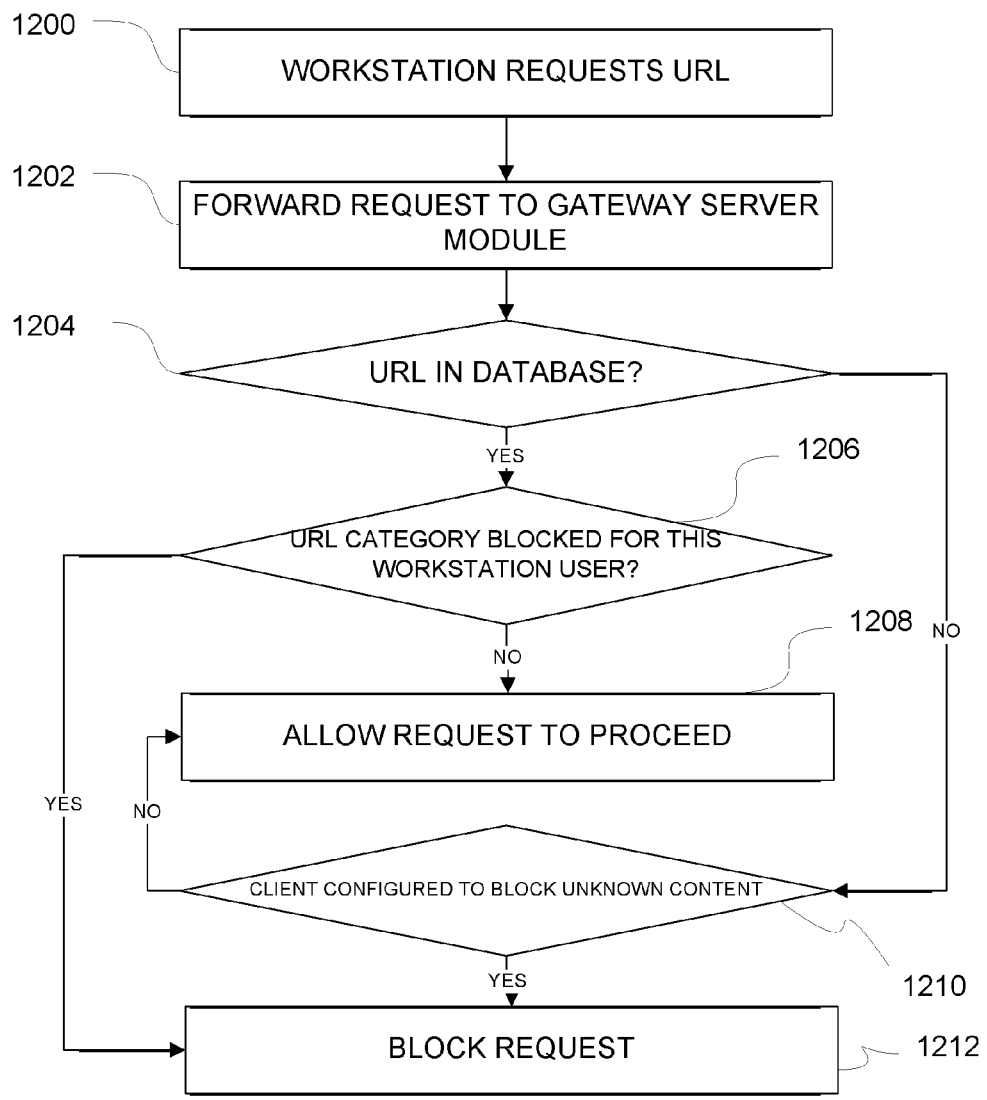
FIG. 16 is a flowchart describing how URLs may be handled in the gateway server module in one embodiment.

As discussed above in connection with FIG. 3, in some embodiments, the gateway server module 120 may be configured to control access to certain URLs based on data stored in the categorized URL database 146. FIG. 16 is a flowchart describing an embodiment in which the gateway server module handles a request from a workstation 116.

At block 1200, the workstation 116 requests a URL from the Internet 112. This request is intercepted at the Internet gateway and forwarded to the gateway server module 120 at block 1202. At block 1204, the categorized URL database 146 is queried to determine if the requested URL is stored in the database 146. If the requested URL is found as a record in the database, the process moves on to block 1206, where it analyzes the URL record to determine whether the category of the URL is one that should be blocked for the workstation user. If the category is blocked, the process skips to block 1212 and the request is blocked. If the category is not blocked, however, the request is allowed at block 1208.

If the requested URL is not found as a record in the categorized URL database 146 at block 1204, the system proceeds to block 1210. At block 1210, the system determines how to handle the uncategorized content. In some embodiments, the system may utilize the policy module 142 to make this determination. If the gateway server module 120 is configured to block requests for uncategorized content, the process moves to block 1212, and the request is blocked. If, on the other hand, the module is configured to allow these types of uncategorized requests, the process moves to block 1208, where the request is allowed to proceed to the Internet 112.

Figure 17:
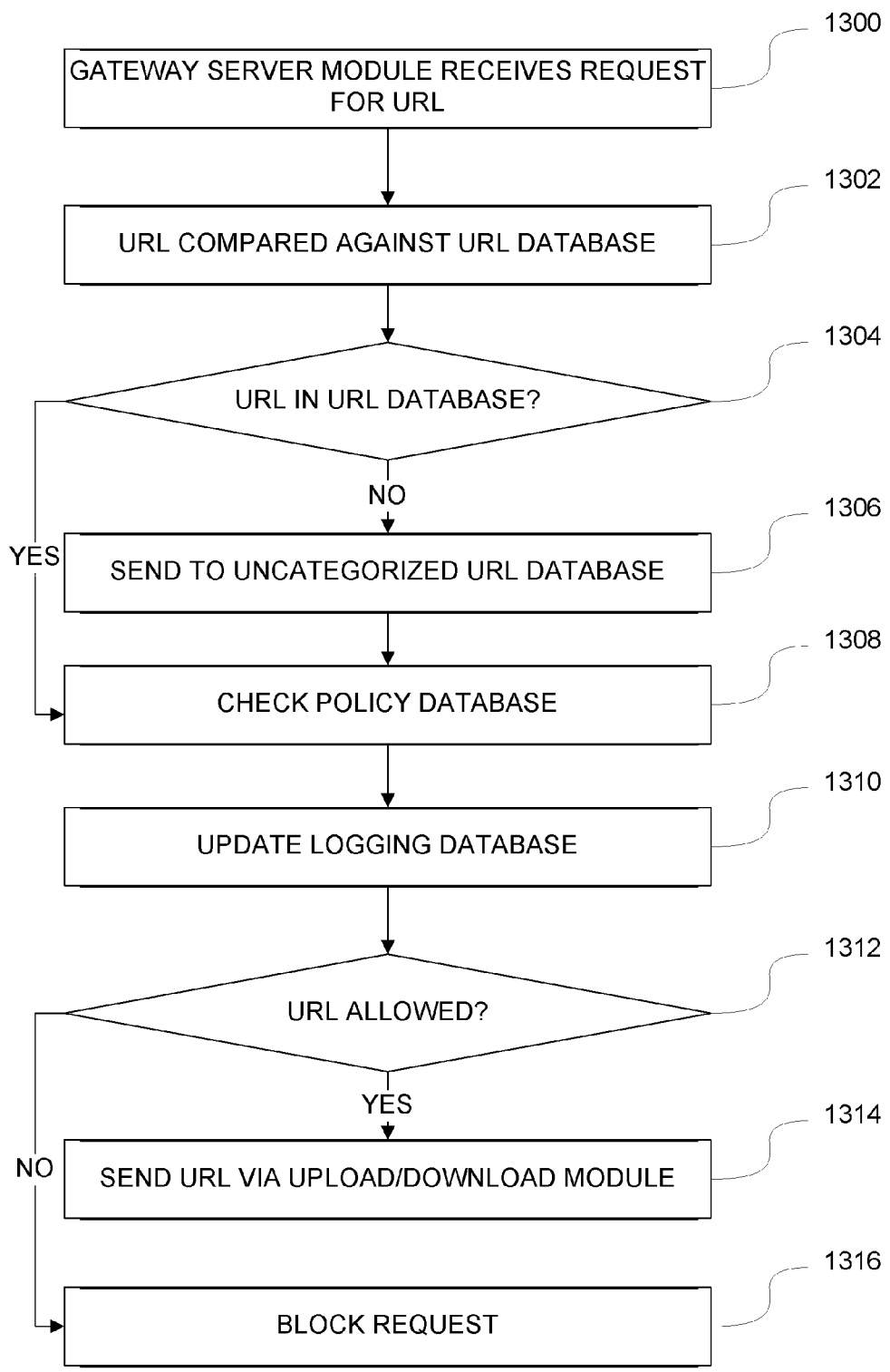
FIG. 17 is a flowchart describing how URLs may be handled by the gateway server module in conjunction with the policy module according to certain embodiments.

In some embodiments, the request of URL data may result in new records being added to the logging database 144. These records may be later transferred to the database management module 114 for further analysis. Referring now to FIG. 17, another flowchart describing a process by which the gateway server module may handle a URL request is provided. At block 1300, the gateway server module 120 receives a request for a URL. As noted above, this request may come from a workstation 116. At block 1302, the URL is then compared against the categorized URL database 146, and the system determines at block 1304 whether the requested URL is in the categorized URL database.

If the URL is already in the categorized URL database 146, the process skips to block 1308. If the requested URL is not found in the categorized URL database 146, however, the process moves to block 1306 where the URL is inserted into the uncategorized URL database 147. In some embodiments, the logging database 144 and the uncategorized URL 147 database may be the same database. After inserting the URL into the database, the method proceeds to block 1308. At block 1308, the policy database is checked for instructions on how to handle the received URL. Once the policy module 142 has been checked, the logging database 144 is updated to record that the URL has been requested at block 1310. If the workstation 116 is permitted to access the URL by the policy database, the process moves to block 1314 and the URL request is sent to the Internet 112. If, however, the policy database does not allow the request, the process skips to block 1316 and the request is blocked.

Figure 18:
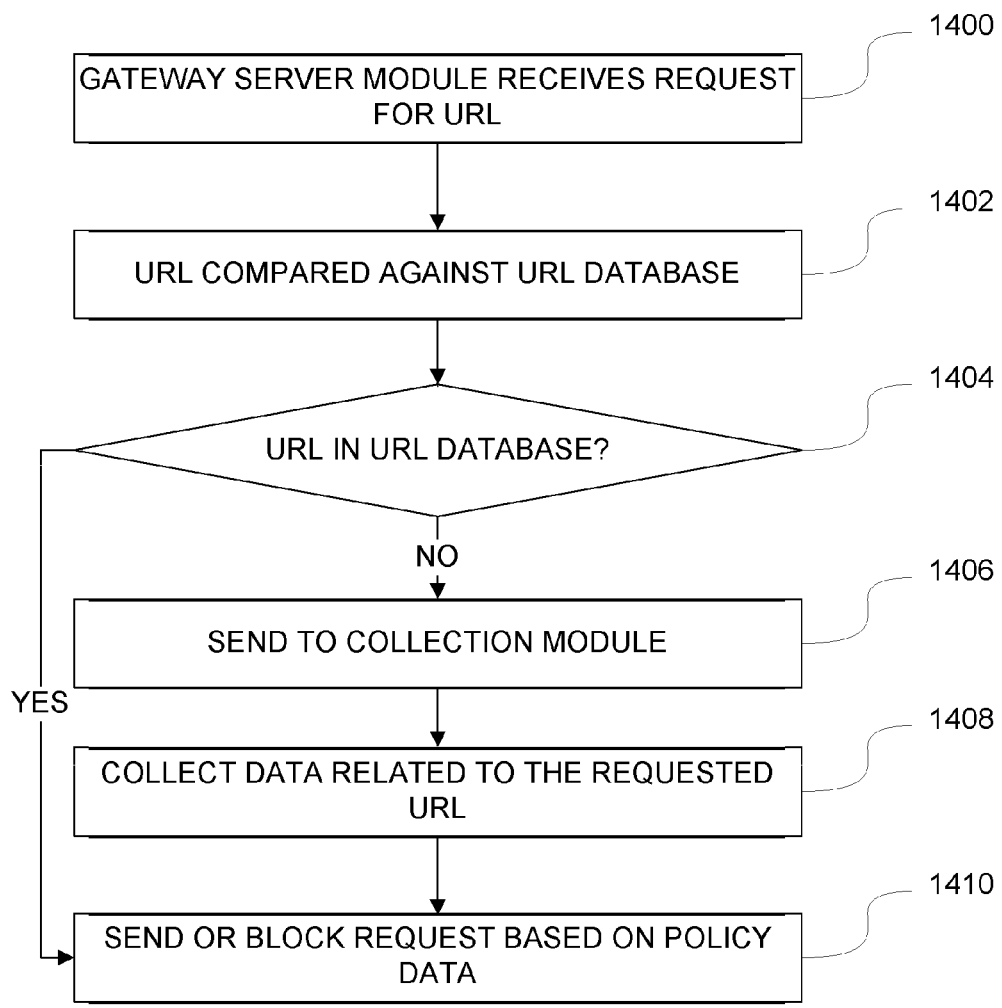
FIG. 18 is a flowchart describing the how the collection system may handle a URL within the gateway server module.

In some embodiments, the gateway server module 120 may perform collection activities to lessen the burden on the collecting system 182 of the database management module 114. FIG. 18 provides an example of a system in which the gateway server collection module 140 is used to collect data about an uncategorized URL. At block 1400, the gateway server module receives a request for a URL. Next, at block 1402, the requested URL is compared against the categorized URL database. If the system determines that the requested URL is in the URL database at block 1404, the process moves to block 1410, where the request is either forwarded to the Internet 112 or blocked depending on how the URL is categorized.

If the requested URL is not in the categorized URL database 146, the process moves to block 1406 where the URL is sent to the gateway server collection module 140. Next, at block 1408, the collection module 140 collects URL data about the requested URL. In some embodiments, this data may be stored in the uncategorized URL database 147. Alternatively, this data may simply be forwarded to the database management module 114 via the Internet 112. Once the data has been collected and stored, the process moves to block 1410 where the URL request is either allowed or blocked based on the policies indicated in the policy module 142.

As discussed previously, uncategorized URL data may be sent from the gateway server module 120 to the database management module 114 for further analysis so that the URL may be categorized and added to the categorized URL database 146. However, because the volume of uncategorized data is so large at times, it may not be possible to categorize all of the received data without compromising accuracy or speed. As a result, in some instances, it may be desirable to identify candidate URLs within the uncategorized data that are most likely to present a threat to workstations 116 and networks 110.

Figure 19:
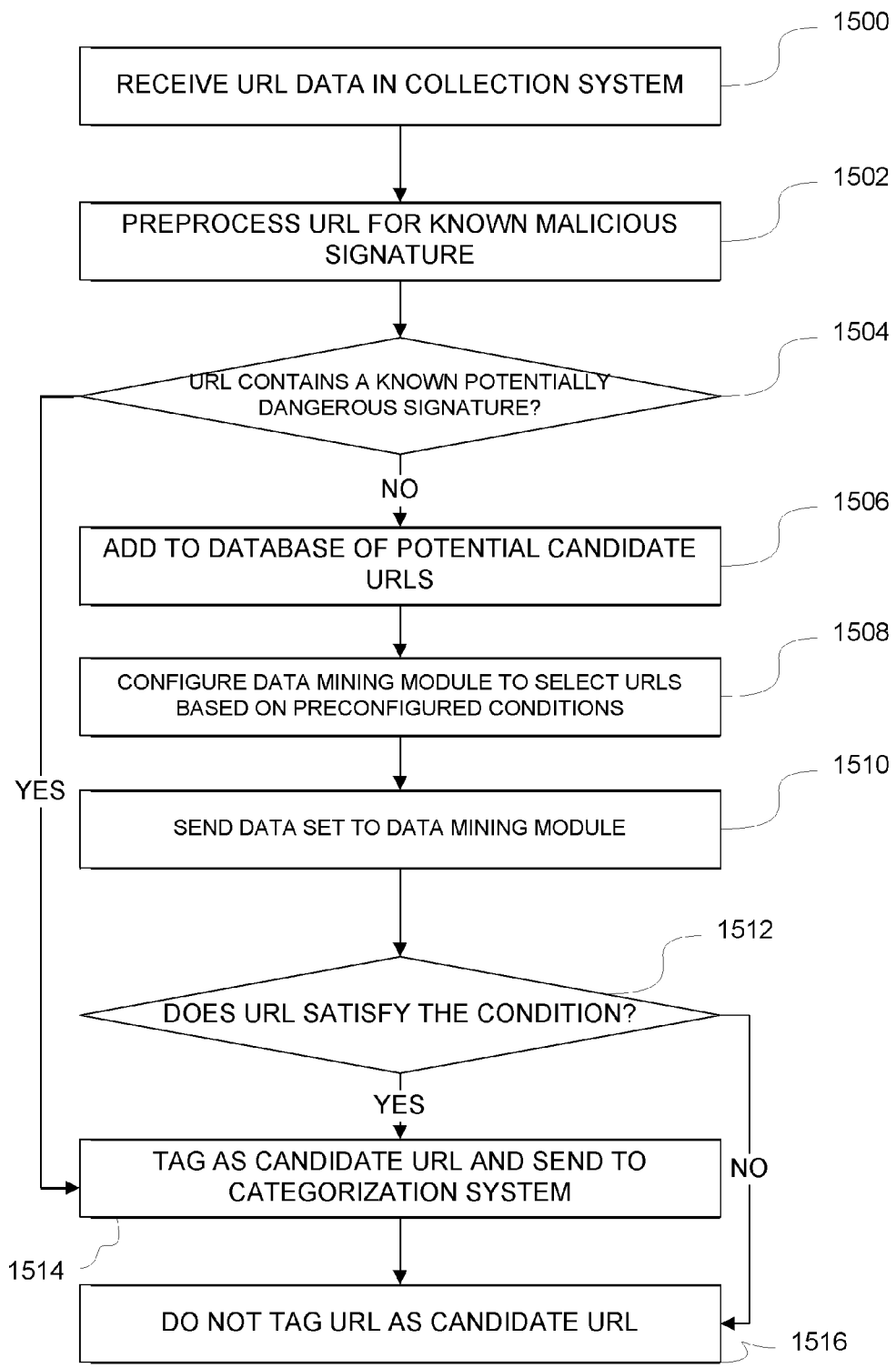
FIG. 19 is a flowchart describing the how the collection system may handle a URL within the database management module.

FIG. 19 provides an example of a method for identifying candidate URLs for further analysis. The method starts with a URL being received into the collection system 182 of the database module 114. At block 1502, the URL or application is preprocessed to determine whether it carries a known malicious data element or data signature. Next, at block 1504, if the system determines that the URL includes a known malicious element, the process skips to block 1514 where the URL is tagged as a candidate URL and sent to the scoring/classification system 186 for further analysis. If the initial analysis of the URL in block 1504 does not reveal a malicious element, the process moves to block 1506, where the URL is added to a database of potential candidate URLs. Next, at block 1508, the data mining module 192 is configured to select URLs from sources 194 (of which the database of potential candidate URLs is one) based on preconfigured conditions such as attack strings, virus signatures, and the like. The data set including all of the data sources 194 is then sent to the data mining module 192 at block 1510, where each URL is analyzed by the data mining module 192 at block 1512. If the URL satisfies the defined preconfigured conditions, the process moves to block 1514 where the URL is tagged as a candidate URL and sent on to the scoring/classification system 186 for additional analysis. If, however, the URL does not meet the conditions specified for converting it to a candidate URL, the method proceeds to block 1516 and the URL is not tagged as a candidate. Although this embodiment is described in the context of URL candidate classification, one of skill in the art will readily appreciate that applications may be similarly analyzed and tagged as candidates using the process described above.

Figure 20:
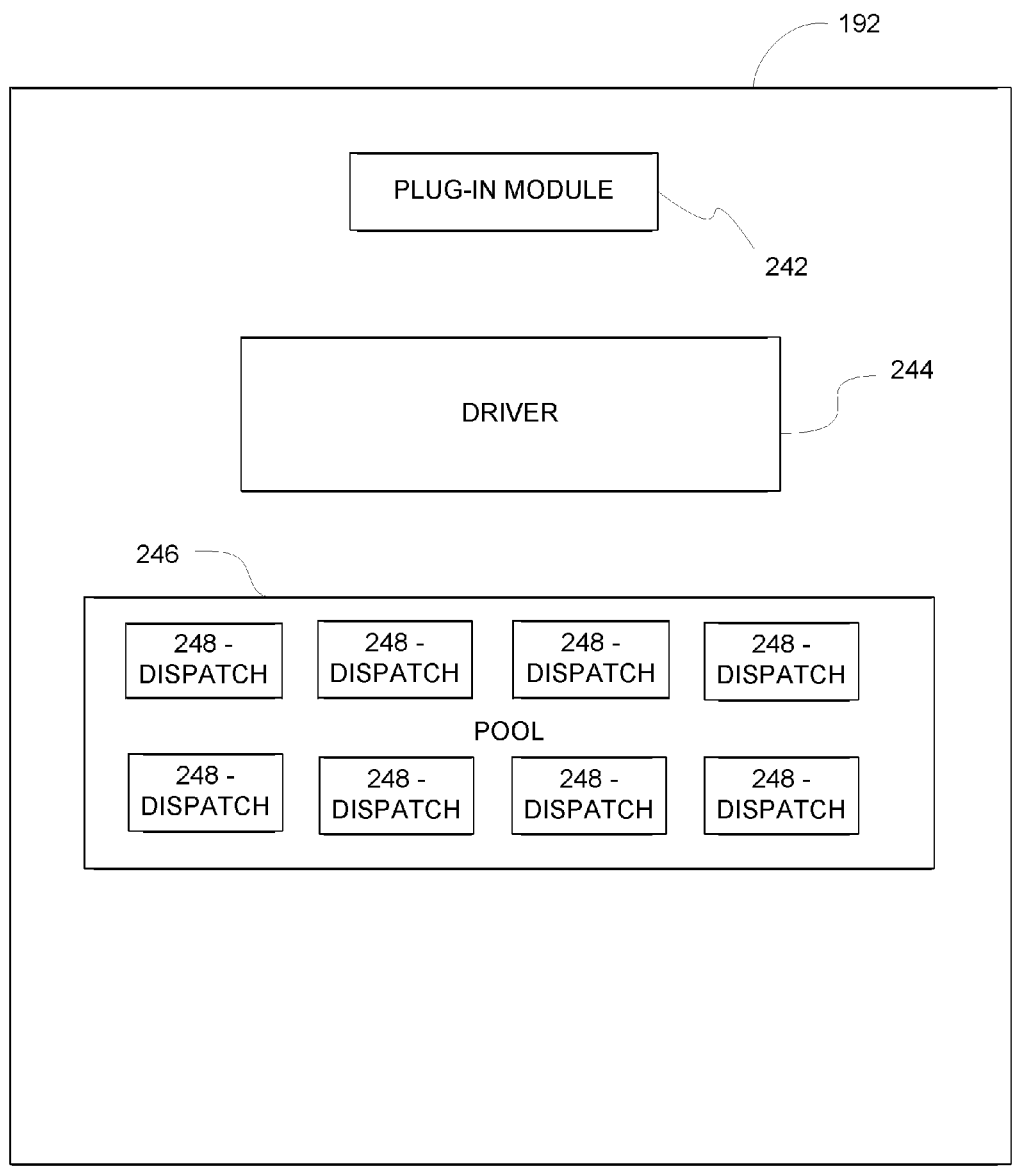
FIG. 20 is a block diagram of a data mining system.

As discussed above, one of the challenges to collecting and analyzing Internet data to determine whether it includes harmful active content is the sheer volume of data that must be collected and analyzed. In yet another embodiment, the data mining module 192 may be used to address these issues by collecting large volumes of relevant data to utilize system resources effectively and efficiently. Referring now to FIG. 20, a more detailed block diagram of the data mining system 192 is provided. The data mining system 192 may take the form of a software module that runs a plurality of asynchronous processes to achieve maximum efficiency and output. The data mining system 192 may include a plug-in module 242 which receives configuration parameters which provide instruction on how inputted data should be handled. In one embodiment, the instructions received by the plug-in module may take the form of an HTTP protocol plug-in that provide parameters for the data mining system 192 to receive URL data and analyze and supplement the data based on various HTTP-related instructions implemented by the data mining system on the URL data. In another embodiment, the plug-in may be geared toward mining some other protocol such as FTP, NNTP, or some other data form.

The data mining system 192, which may also be used to implement passive honey clients, also include a pool 246 of dispatchers 248. The dispatchers 248 are individual asynchronous processing entities that receive task assignments based on the data input (for analysis) into the data mining system and the configuration data received by the plug-in module 242. The pool 246 is a collection of the dispatchers that is controlled by a driver 244. The driver 244 is a managing mechanism for the pool. The driver 244 may be configured to monitor the activity of the dispatchers 248 in the pool 246 to determine when to send additional data into the pool 246 for mining and analysis. In one embodiment, the driver may be configured to send new data units into the pool 246 whenever any dispatchers 248 are idle. In one embodiment, the driver 244 may be utilized as a control server for managing honeyclient miners 222 as described above in connection with FIG. 10. The pool 246 may deliver the data unit to the idle dispatcher 248. The dispatcher 248 reads the plug-in configuration and performs actions in accordance with plug-in module 242.

In one embodiment, the plug-in module 242 may receive an HTTP plug-in. The HTTP plug-in may be configured to receive input data in the form of URL strings about which the data mining system 192 will obtain additional information such as the page content for the URL, HTTP messages returned by the URL when accessed (such as "4xx—file not found" or "5xx—server error"). The plug-in may further specify a webcrawling mode in which the dispatches, in addition to collecting page content, also add URL links within the URL content to the URL data set to be analyzed.

Figure 21:
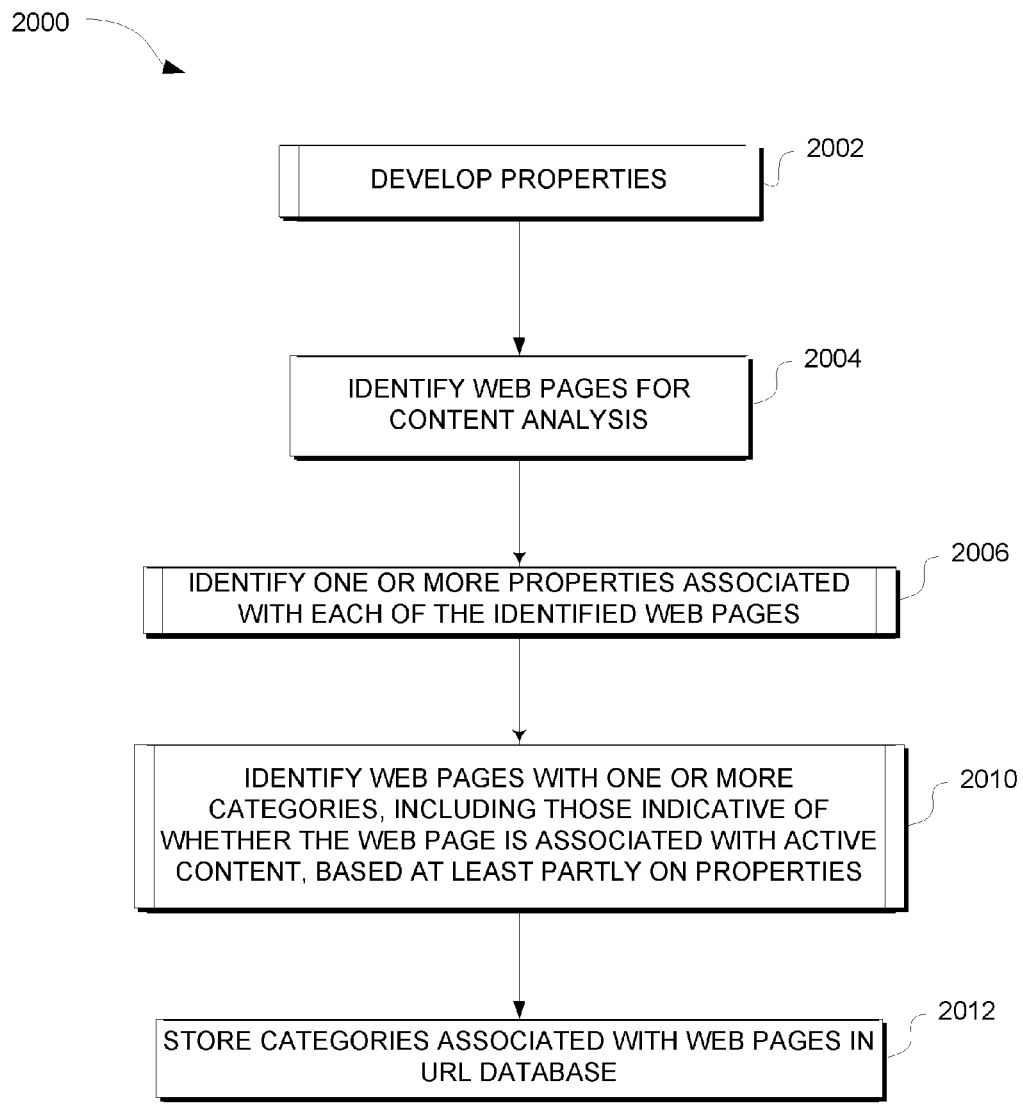
FIG. 21 is a flowchart illustrating one embodiment of a method of categorizing URLs within the database management module.

FIG. 21 is a flowchart illustrating one embodiment of a method 2000 of categorizing URLs within the database management module 114. The method 2000 begins at a block 2002 in which properties are developed that can be used to categorize web pages. In one embodiment, the training module 184 is used to develop the properties in the properties database 320. In one embodiment, developing the properties includes developing definitions, e.g., expressions relating one or more properties, and storing the definitions in the definitions database 326. Next at a block 2004, web pages are identified for content analysis. In one embodiment, the collections module 190 identifies web pages for content analysis. In one embodiment, web pages having properties or other indicia of active content are identified for content analysis.

Moving to a block 2006, the content analysis module 322 identifies one or more properties associated with each of the identified web pages. Functions of block 2006 are described in more detail hereafter with reference to FIG. 22. Proceeding to a block 2010, the static content classification module 328 identifies web pages with one or more categories based at least partly on properties. In one embodiment, the static content classification module 328 compares definitions from the definitions database 326 with the properties of each web page to identify its properties. In one embodiment, the categories include those indicative of whether the web page is associated with active content. In one embodiment, the categories include those indicative of types of active content, e.g., malicious, phishing sites, keyloggers, viruses, worms, etc., associated with or referenced by the web page. In one embodiment, the active content is included in the body of the web page. In one embodiment, the active content is referenced in a link or ActiveX object element of the web page. In one embodiment, active content includes interactive "phishing" sites that include content tending to mislead users into providing credentials or other sensitive, private, or personal information. In one embodiment, the scoring module 330 further scores and classifies the web pages. Moving to a block 2012, the categories associated with the web pages are stored in the URL database. In one embodiment, the upload download module 178 of FIG. 7 distributes the new URL categories to one or more gateway server modules 120 or workstations 116 (both of FIG. 1). In one embodiment, one or more blocks of the method 2000, e.g., blocks 2006-2012, may be performed either continuously as new URLs are received by the collections module 190. In one embodiment, one or more blocks of the method 2000, e.g., blocks 2006-2012, may be performed periodically.

Figure 22:
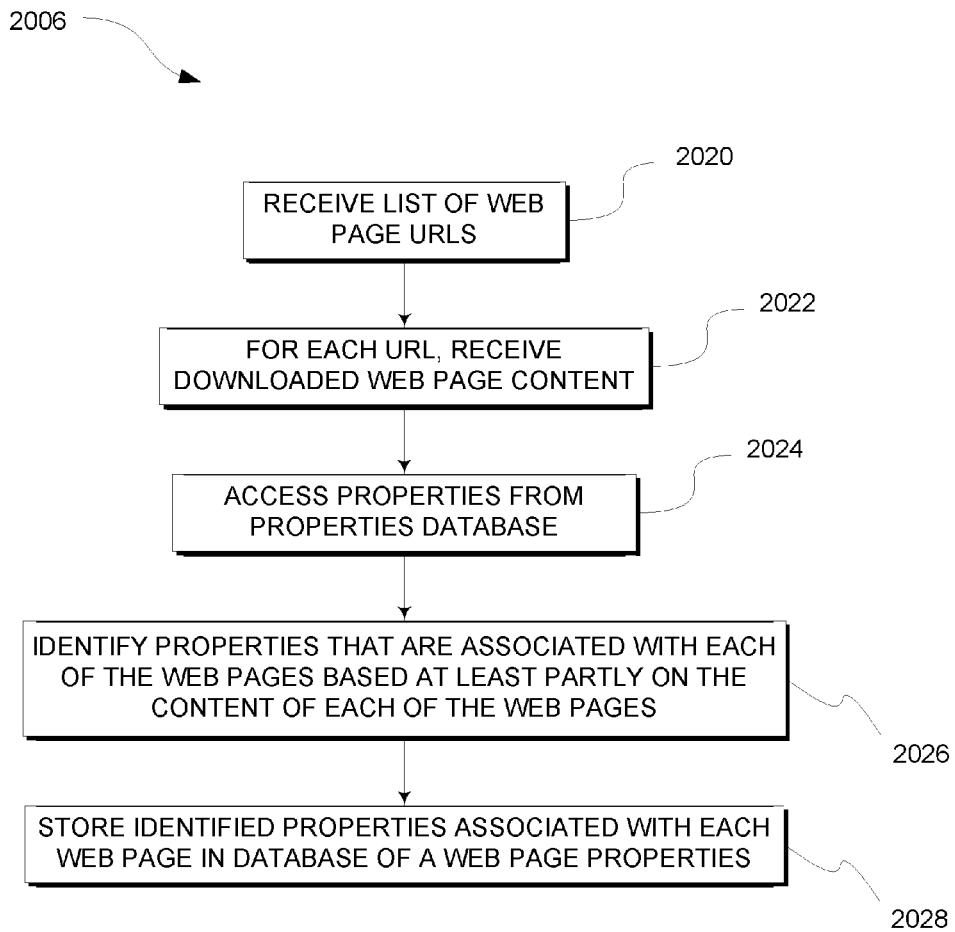
FIG. 22 is a flowchart illustrating one embodiment of a method of identifying properties of a URL in the method of FIG. 21.

FIG. 22 is a flowchart illustrating one embodiment of a method of performing the function of the block 2006 of FIG. 21. The method begins at a block 2020 in which the content analysis module 322 receives a list of web page URLs in the URL database 180. In one embodiment, the collection module 190 provides the list of candidate URLs. Next at a block 2022, for each URL, the content analysis module 322 receives downloaded web page content. In one embodiment, the collection module 190 downloads the content and stores it in the URL database 180 from which the content analysis module 322 accesses the content. In another embodiment, the content analysis module 322 downloads and processes the content. Moving to a block 2024, the content analysis module 322 accesses properties from the properties database 320. Next at a block 2026, the content analysis module 322 identifies properties that are associated with each of the web pages based at least partly on the content of each of the web pages. In one embodiment, the content analysis module 322 scans the content to identify string, keyword, and regular expression properties from the properties database 320. In one embodiment, the content analysis module 322 may also decode content prior to, and/or after, scanning for properties. For example, the content analysis module 322 may decode web content such as URL-encoded portions of URLs or hex-coded web addresses prior to scanning to help prevent keywords from being hidden by encoding or partially encoding the keywords. Proceeding to a block 2028, the content analysis module 322 stores the identified properties associated with each web page in the processed web page properties database 324.

Figure 23:
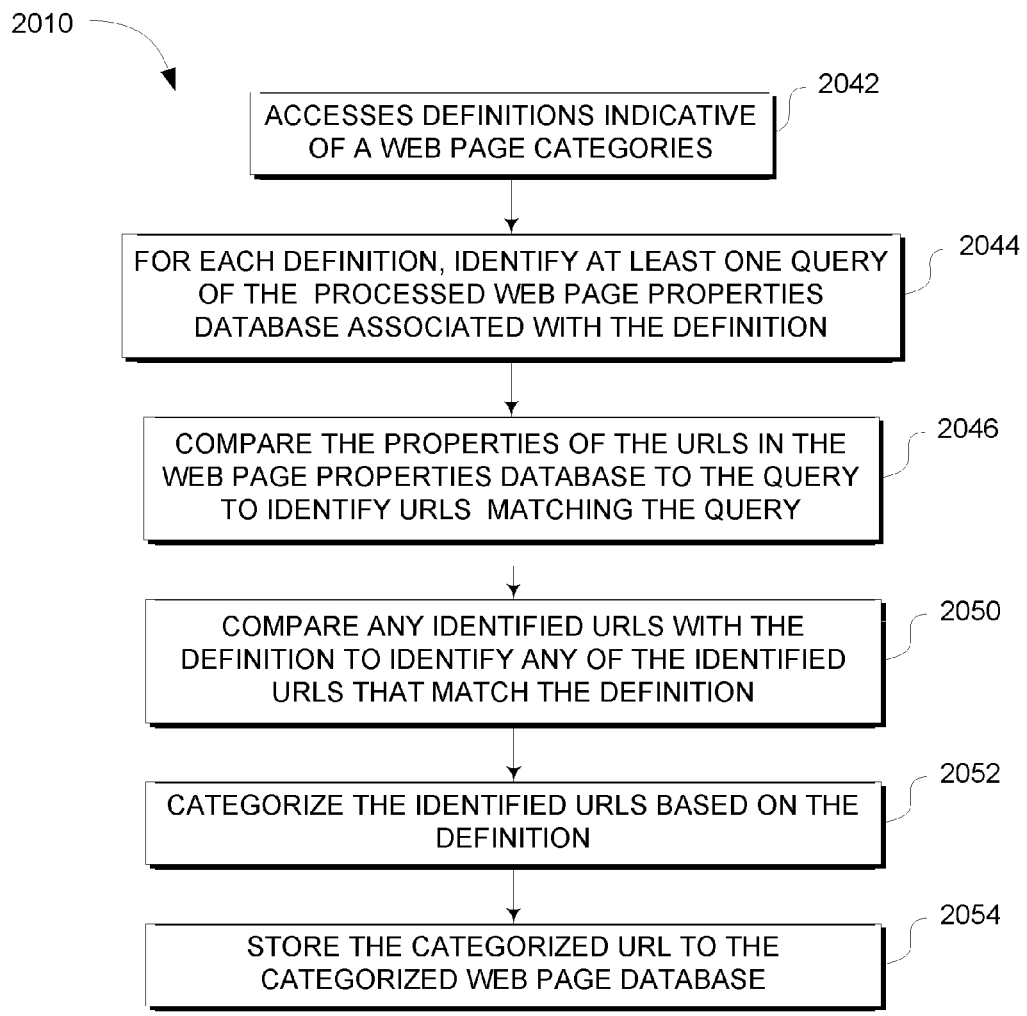
FIG. 23 is a flowchart illustrating one embodiment of a method of categorizing URLs based on URL properties in the method of FIG. 21.

FIG. 23 is a flowchart illustrating one embodiment of a method of performing the function of the block 2010 of FIG. 21. The method begins at a block 2042 in which the static content classification module 328 accesses definitions indicative of web page categories from the definitions database 326. Next at a block 2044, for each definition, the static content classification module 328 identifies one or more queries associated with each definition against the processed web page properties database 324. In one embodiment, the queries comprises SQL queries.

Moving to a block 2046, the static content classification module 328 compares the properties of the URLs in the web page properties database to the query to identify URLs matching the query. In one embodiment, the static content classification module 328 performs the comparison by executing the one or more identified database queries against the processed web page properties database 324. Next at a block 2050, the static content classification module 328 compares any identified URLs with the definition to identify any of the identified URLs that match the definition. In one embodiment, this comparison includes comparing the results of the database query using additional executable instructions, such as a Perl script, to identify matching URLs. Proceeding to a block 2052, the static content classification module 328 categorizes the identified URLs based on the definition. In one embodiment, each definition is associated with a single category. In another embodiment, each definition is associated with several categories that are each identified with the URL. In yet another embodiment, the definition may include logical expressions that identify one or more categories to identify with the URL. For example, an if-then-else expression may identify different categories depending on the result of the if expression. In one embodiment, the content scoring module further scores the URL. Based on the score, the same, different, or additional categories may be identified with the URL. Next at a block 2054, the static content classification module 328 stores the categories of each URL to a categorized web page database. In one embodiment, the URL database 180 includes the categorized web page database.

Figure 24:
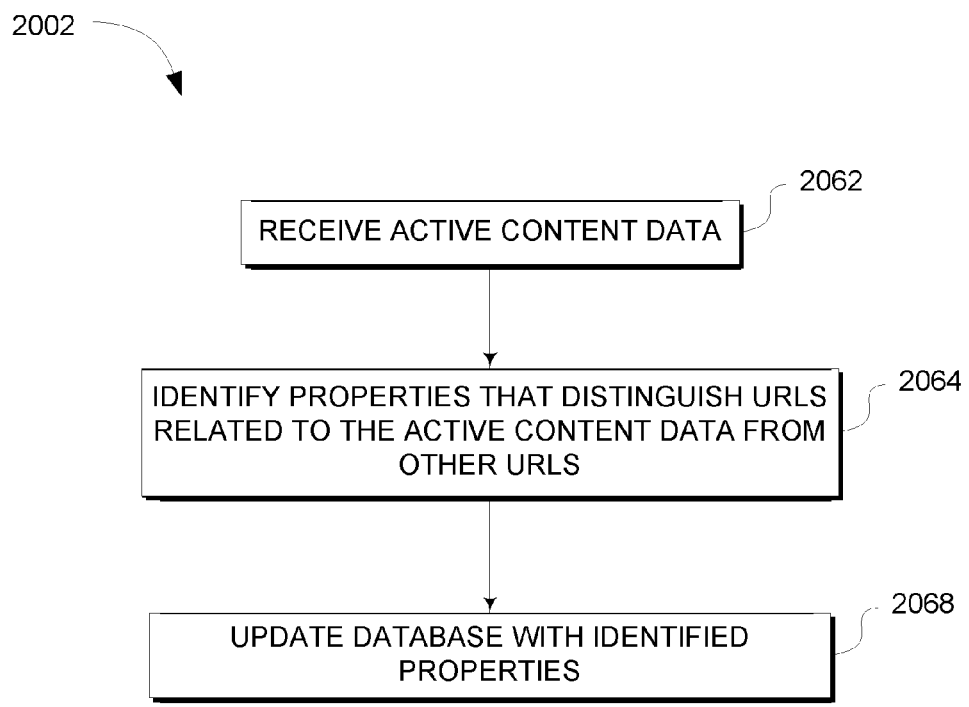
FIG. 24 is a flowchart illustrating one embodiment of a method of identifying properties used in categorizing URLs in the methods of FIGS. 22 and 23.

FIG. 24 is a flowchart illustrating one embodiment of a method of performing the function of the block 2002 of FIG. 21 as part of identifying the properties used in categorizing URLs in the methods of FIGS. 22 and 23. The method begins at a block 2062 in which the analysis tasking module 352 of FIG. 14 receives active content data or URLs associated with active content. Next at a block 2064, property identification module 254 identifies properties that distinguish the target URLs related to the active content data from other URLs and identifies one or more categories associated with the target URLs. In one embodiment, the scoring and classification system 186 is used to help identifies these properties. In addition, definitions comprising one or more of the properties may be identified that distinguish the target URLs that are associated with a particular category from other URLs that should not be associated with that category. Moving to a block 2068, the database update module 356 stores the properties, definitions, and categories in the properties database 320 and the definitions database 326. These updated properties and definitions are thus made available for processing URLs using, for example, the method illustrated in FIG. 21.

Figure 25:
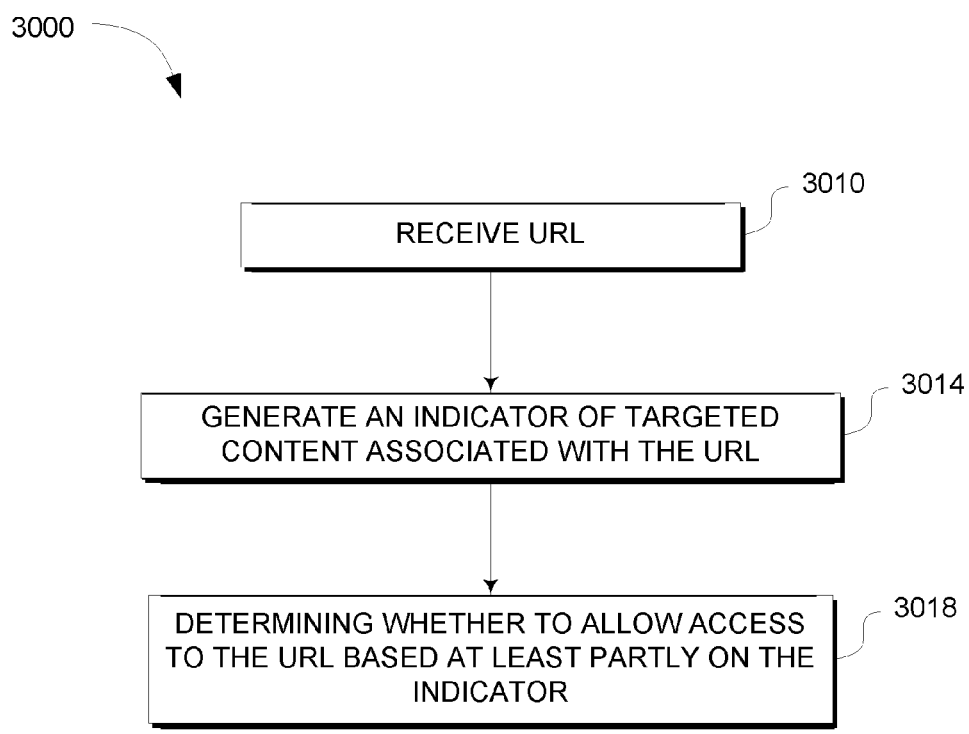
FIG. 25 is a flowchart illustrating one embodiment of a method of controlling access to web content based on an indicator associated with a requested web address.
Figure 1:
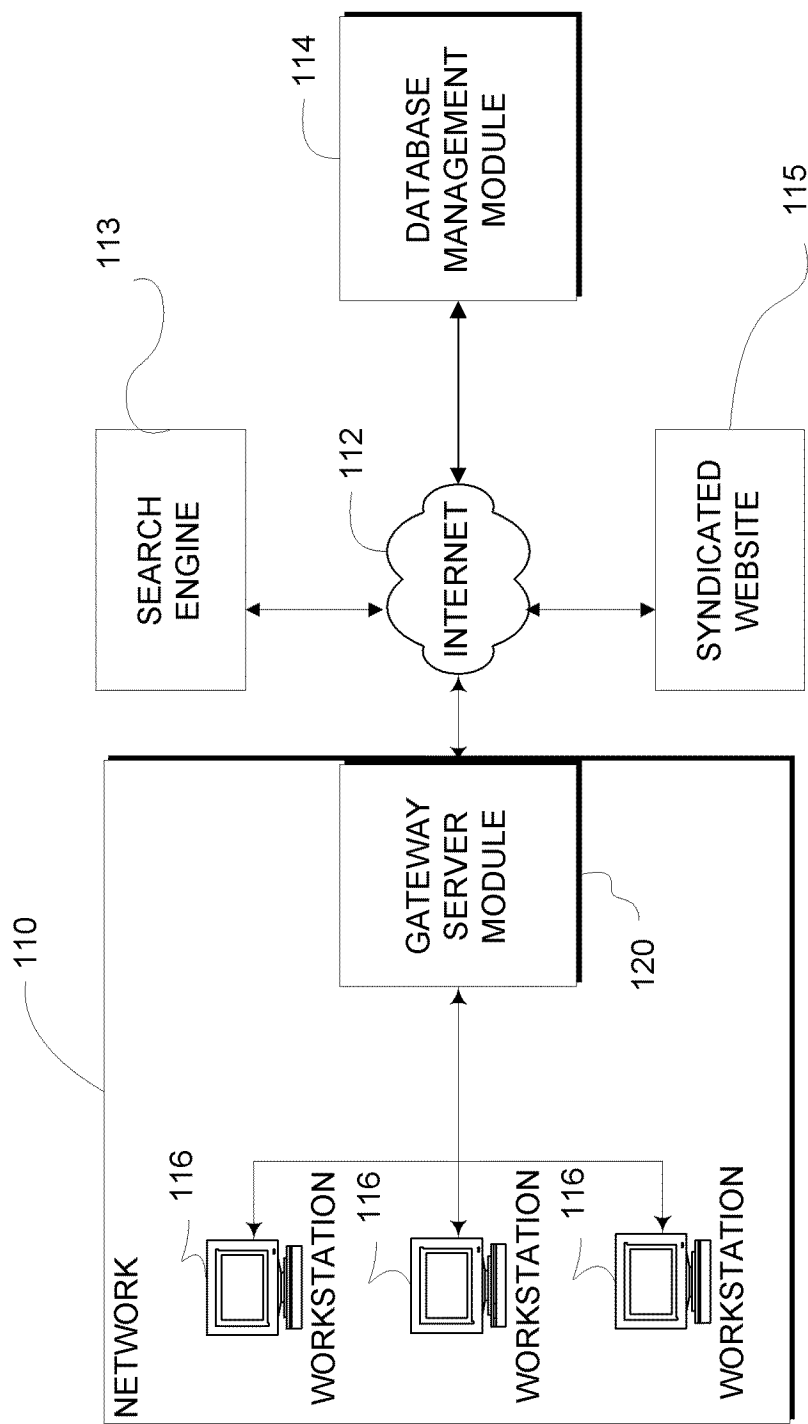
Figure 2:
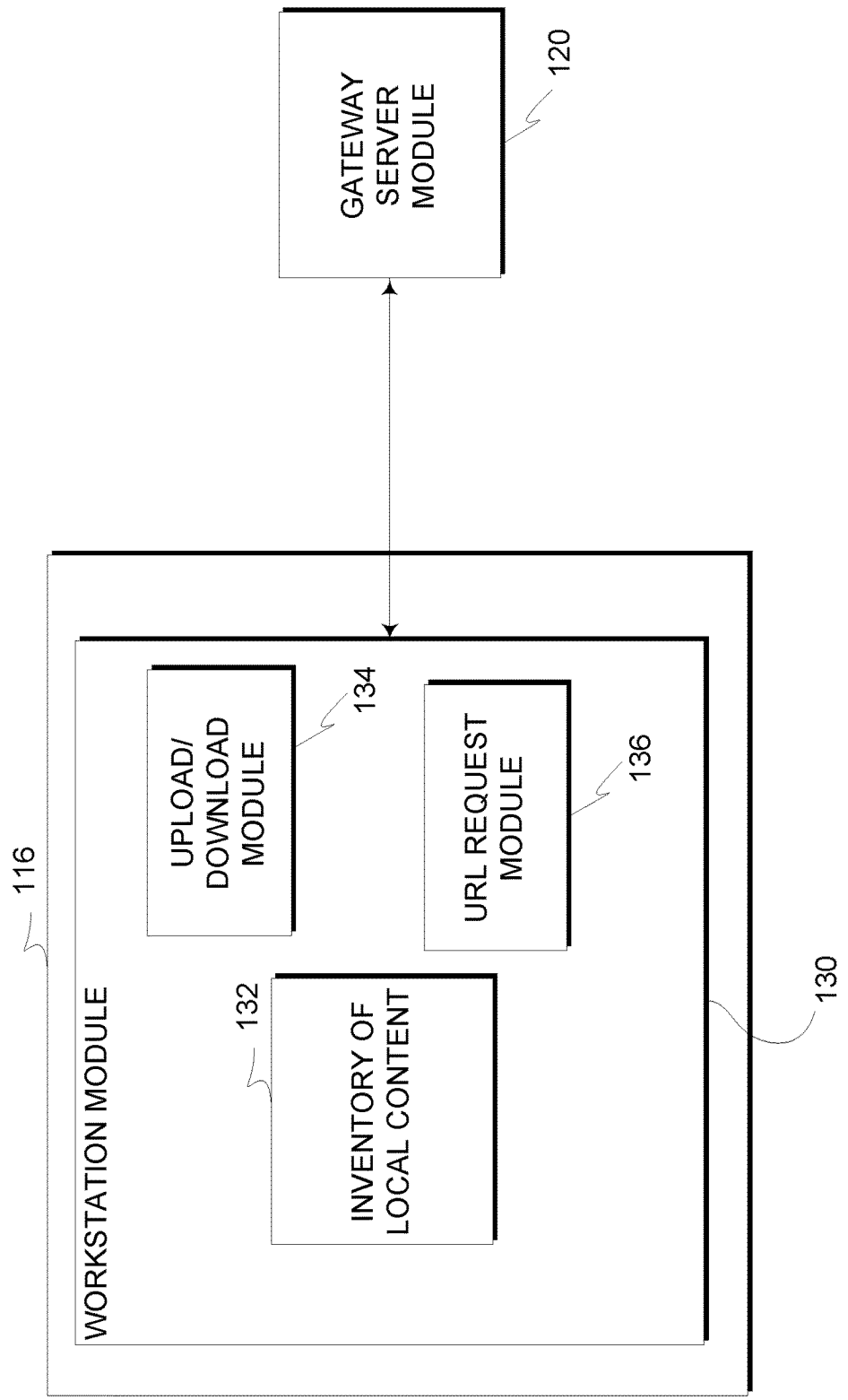
Figure 3:
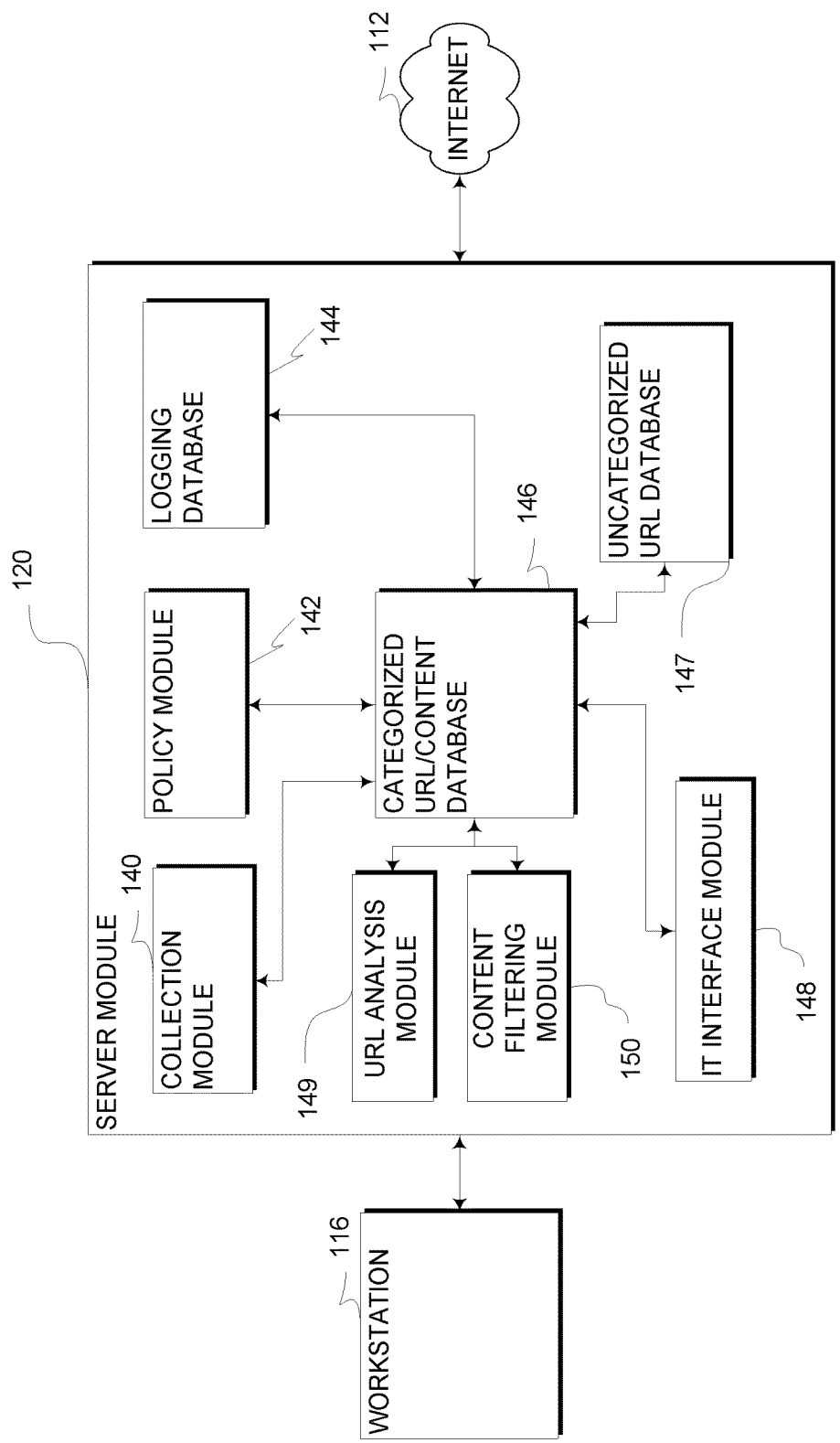
Figure 8:
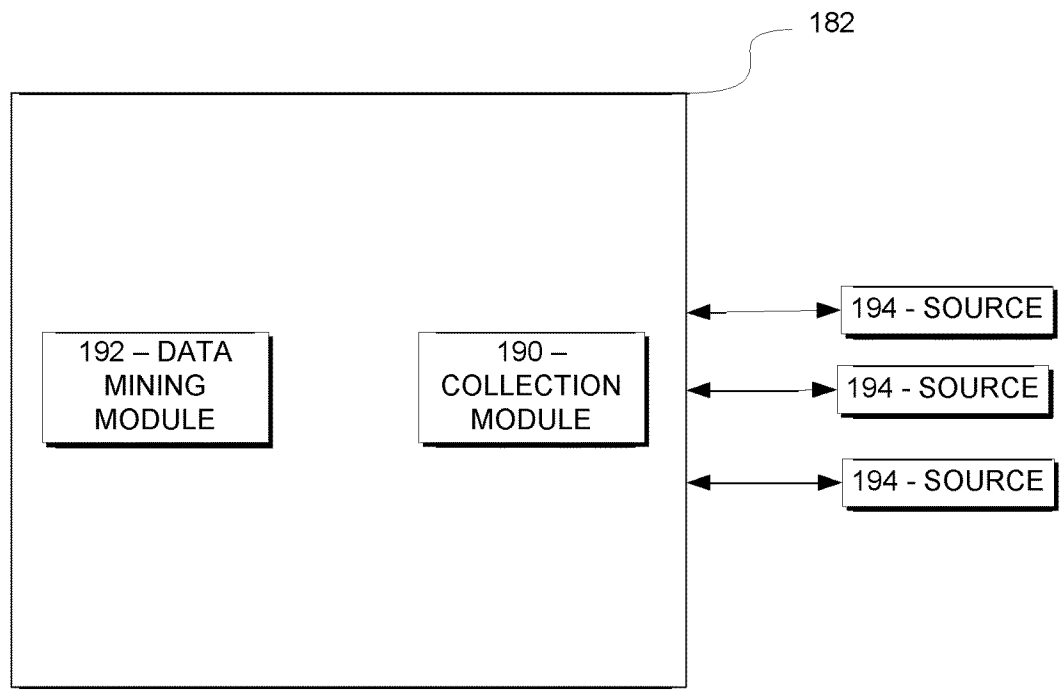
Figure 9:
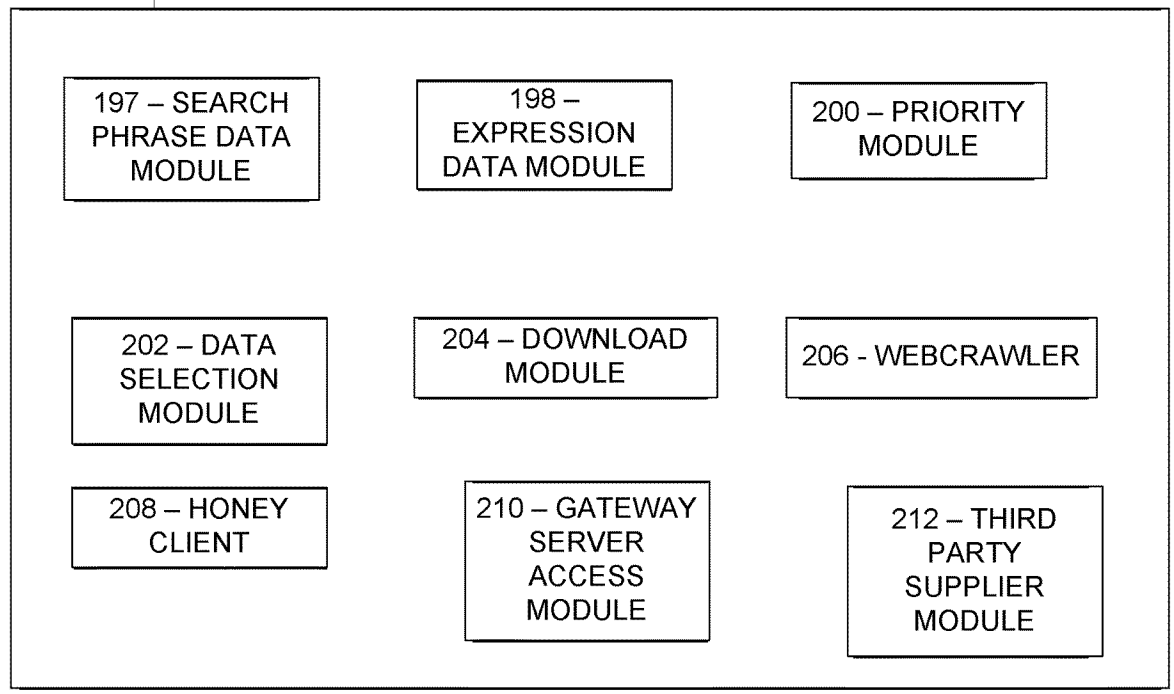
Figure 12:
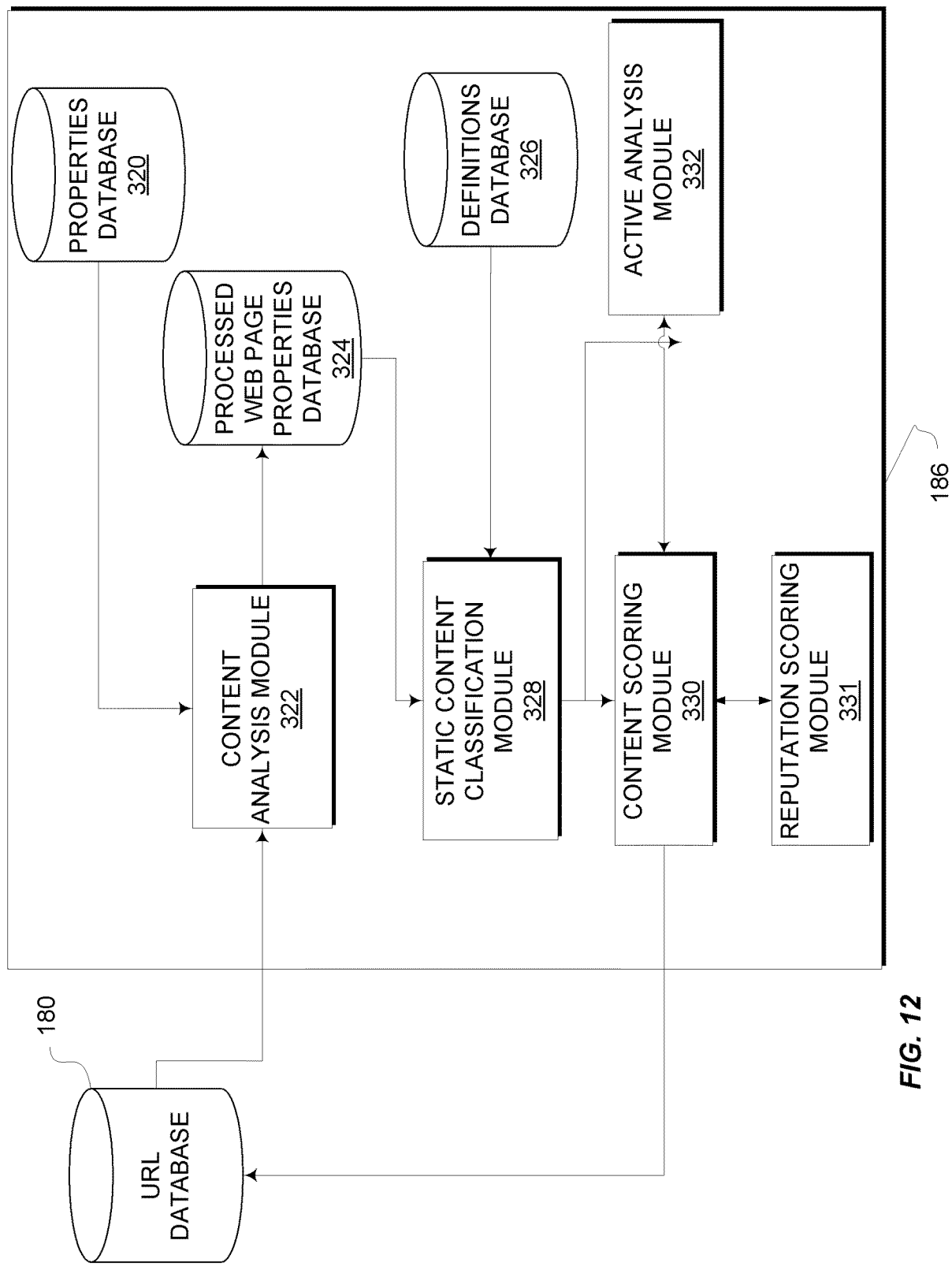
Figure 14:
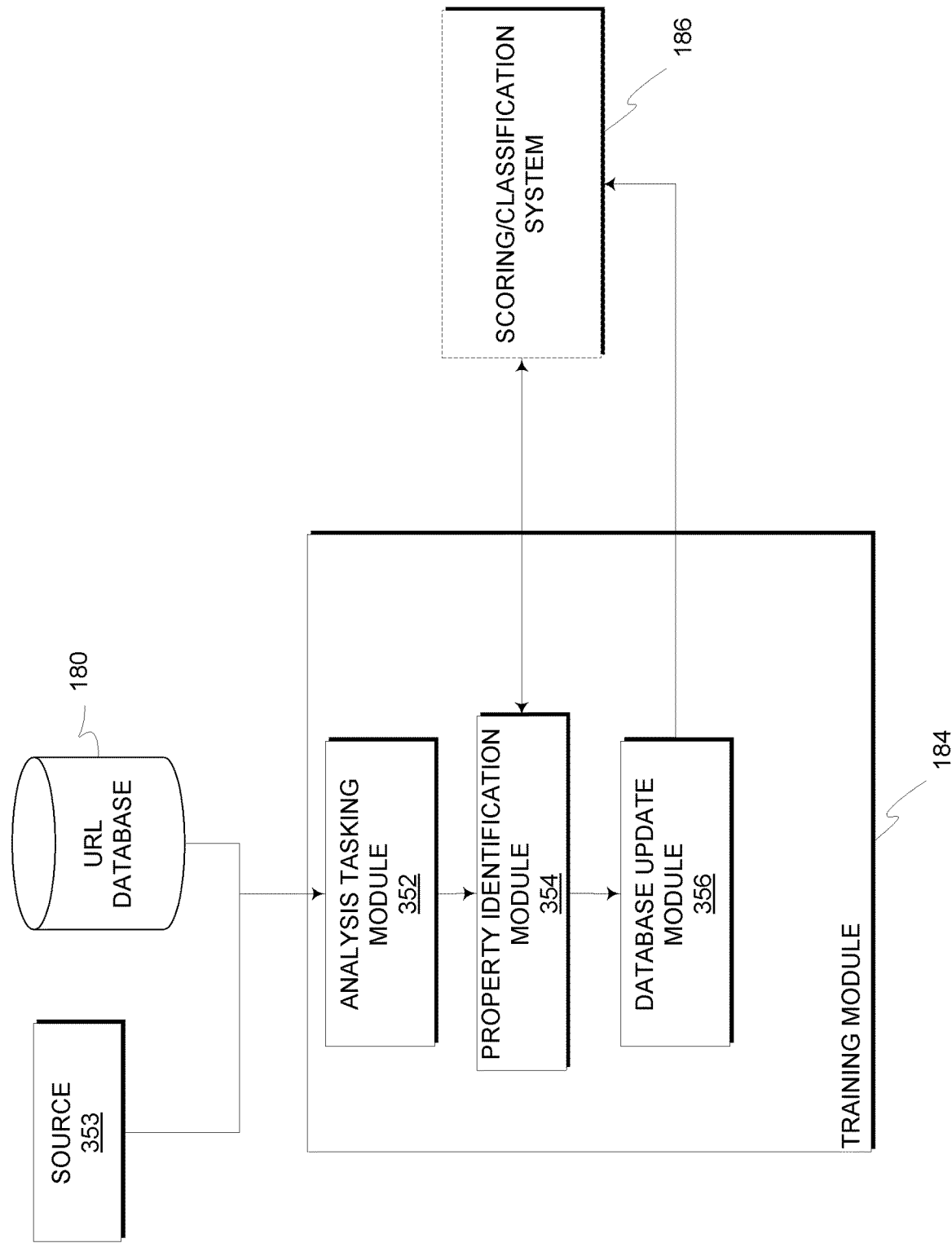

FIG. 25 is a flowchart illustrating one embodiment of a method 3000 of controlling access to web content based on the components of a requested URL. The method 3000 begins at a block 3010 in which, for example, the URL analysis module 149 of the gateway server module 120 of FIG. 1 receives a request for a URL from a workstation 116. Next at a block 3014, a reputation scoring module generates a reputation score or other reputation indicator of targeted content associated with the URL. The reputation scoring module may be located locally at the gateway server module 120 or remote from the gateway server module 120. For example, the reputation scoring module 331 may be part of the database management module 114.

Methods of generating reputation scores are discussed above with reference to the URL analysis module 149 and the reputation scoring module 331. It is to be recognized that, depending on the embodiment, reputation scoring may be performed either as a sole means of allowing access to requested URLs or in combination with URL policies and/or URL categories. Moving to a block 3010, the gateway server module 120 determines whether to allow access to the URL based at least partly on the reputation score.

Alternatively, or additionally, the reputation scoring module 331 may provide the reputation score to the content scoring module 330, which may determine a category of the requested URL at least partly based on the reputation score. The gateway server module 120 may rely upon the determined category in combination with the score associated with the URL when determining whether to allow the user access to the website associated with the requested URL.

As used herein, "database" refers to any collection of stored data stored on a medium accessible by a computer. For example, a database may refer to flat data files or to a structured data file. Moreover, it is to be recognized that the various illustrative databases described in connection with the embodiments disclosed herein may be implemented as databases that combine aspects of the various illustrative databases or the illustrative databases may be divided into multiple databases. For example, one or more of the various illustrative databases may be embodied as tables in one or more relational databases. Embodiments may be implemented in relational databases, including SQL databases such as mySQL, object oriented databases, object-relational databases, flat files, or any other suitable data storage system.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the above, one will appreciate that embodiments of the invention overcome many of the longstanding problems in the art by providing an efficient means of processing the large numbers of URLs that are available on the Internet to identify categories for URLs, particularly those that have active content. URLs having many types of active content may be difficult even for a human analyst to categorize because the relevant properties may be buried in executable code, including scripts, or in parameters to ActiveX components. The use of properties and definitions that can be efficiently processed allows ActiveX content to be effectively identified by an automatic process. Furthermore, by storing the properties of web pages in a database for later querying, large numbers of URLs can immediately be categorized based on these stored properties when a new definition of active content is identified.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of controlling access to requested web content, implemented on at least one processor, comprising:
   receiving, using at least the processor, a request for access to web content located at an address specified by a uniform resource locator (URL);
   determining which processes are spawned by the web content identified by the URL;
   comparing which processes are spawned with a list to determine properties of the URL; and
   determining, using at least the processor, whether to allow the request based at least partly on the determined properties.

2. The method of claim 1, wherein the determining is further based on network accesses made by content identified by the URL.

3. The method of claim 1, further comprising:
   determining how content identified by the URL affects processor utilization; and
   comparing the affected processor utilization to a database or rules to determine second properties of the URL, wherein the determining whether to allow the request is further based on the determined second properties.

4. The method of claim 1, further comprising:
   determining how content identified by the URL affects memory usage; and
   comparing the affected memory usage to a database or rules to determine second properties of the URL, wherein the determining whether to allow the request is further based on the determined second properties.

5. The method of claim 1, wherein the determining whether to allow the request is further based on registry access or registry modification of content identified by the URL.

6. The method of claim 1, wherein the determining whether to allow the request is further based on file system access or file system modification performed by content identified by the URL.

7. The method of claim 1 further comprising:
   identifying a category associated with the URL, wherein determining whether to allow the request is based at least partly on the identified category.

8. The method of claim 1 further comprising identifying a policy associated with the URL, wherein the determining whether to allow the request is based at least partly on the policy.

9. The method of claim 8 further comprising determining whether the URL is in a database of categorized URLs.

10. The method of claim 9 further comprising identifying the at least one policy based on the absence of the URL from the database.

11. The method of claim 1, further comprising:
    determining a plurality of scores associated with a plurality of corresponding behavioral properties, each of the behavioral properties defined by characterization of a different monitored action of content identified by the URL;
    determining a weighting of the plurality of the scores; and
    determining whether to allow the request based at least in part on the weighting.

12. A computer system for controlling access to web content comprising:
    a network interface configured to receive a request for web content located at an address specified by a uniform resource locator (URL);
    a processor configured to:
      determine which processes are spawned by the web content identified by the URL;
      compare which processes are spawned with a list to determine properties of the URL; and
      determine whether to allow the request based at least partly on the determined properties.

13. The system of claim 12, wherein the processor is further configured to determine whether to allow the request based on network accesses made by content identified by the URL.

14. The system of claim 12, wherein the processor is further configured to:
    determine how content identified by the URL affects processor utilization;
    compare the affected processor utilization to a database or rules to determine second properties of the URL; and
    determine whether to allow the request further based on the determined second properties.

15. The system of claim 12, wherein the processor is further configured to:
    determine how content identified by the URL affects memory usage, and
    compare the affected memory usage to a database or rules to determine second properties of the URL, wherein the determination of whether to allow the request is further based on the determined second properties.

16. The system of claim 12, wherein the processor is further configured to determine whether to allow the request based on registry access or registry modification of content identified by the URL.

17. The system of claim 12, wherein the processor is further configured to determine whether to allow the request based on file system access or file system modification performed by content identified by the URL.

18. The system of claim 12, further comprising:
    a categorized URL database configured to identify a category associated with the URL, wherein determining whether to allow the request is based at least partly on the identified category.

19. The system of claim 12, wherein the processor is further configured to identify a policy associated with the URL and to determine whether to allow the request based at least partly on the policy.

20. The system of claim 19, wherein the processor is configured to determine whether the URL is in a database of categorized URLs.

21. The system of claim 20, wherein the processor is configured to identify the at least one policy based on the absence of the URL from the database.

22. The system of claim 12, wherein the processor is further configured to:
- determine a weighting of scores associated with behavioral properties, each of the behavioral properties defined by characterization of a different monitored action of content identified by the URL, and
- determine whether to allow the request based at least in part on the weighting.

23. A computer system for controlling access to web content, the system comprising:
- means for receiving a request for web content located at an address specified by an uniform resource locator (URL);
- means for determining which processes are spawned by the web content identified by the URL;
- means for comparing which processes are spawned with a list to determine properties of the URL; and
- means for determining whether to allow said request based at least partly on the determined properties.

* * * * *

UNITED STATES PATENT AND TRADEMARK OFFICE
CERTIFICATE OF CORRECTION

PATENT NO. : 9,654,495 B2
APPLICATION NO. : 11/680494
DATED : May 16, 2017
INVENTOR(S) : Hubbard et al.

It is certified that error appears in the above-identified patent and that said Letters Patent is hereby corrected as shown below:

On the Title Page

On page 5, in Column 2, item (56), under "Other Publications", Line 47, delete "secretservice"" and insert --secret service"-- therefor In the Drawings Please replace FIGS. 1,2,3,8,12,14 with FIGS. 1,2,3,8,12,14 as shown on the attached pages In the Specification In Column 9, Line 54, delete "sever" and insert --server-- therefor In Column 15, Line 9, delete "222." and insert --220.-- therefor In Column 18, Line 4, delete "accesses" and insert --processed-- therefor In Column 25, Line 66, delete "upload download" and insert --upload/download-- therefor In Column 27, Line 17, delete "254" and insert --354-- therefor In Column 27, Line 51, delete "3010," and insert --3018,-- therefor Signed and Sealed this
Twenty-eighth Day of May, 2019

Andrei Iancu
*Director of the United States Patent and Trademark Office*